United States Patent
Jalota et al.

(10) Patent No.: US 12,073,156 B2
(45) Date of Patent: Aug. 27, 2024

(54) PROPAGATING PHYSICAL DESIGN INFORMATION THROUGH LOGICAL DESIGN HIERARCHY OF AN ELECTRONIC CIRCUIT

(71) Applicant: Synopsys, Inc., Mountain View, CA (US)

(72) Inventors: Amit Jalota, Fremont, CA (US); Andrew Saunders, Reading (GB); Aruna Kanagaraj, Karnataka (IN); Douglas Chang, San Jose, CA (US); Eshwari Rajendran, Karnataka (IN); Prashant Gupta, Karnataka (IN); Rajeev Murgai, Bangalore (IN); Soumitra Majumder, West Bengal (IN); Vasiliki Chatzi, Santa Clara, CA (US); Balkrishna Ramchandra Rashingkar, Sunnyvale, CA (US)

(73) Assignee: Synopsys, Inc., Sunnyvale, CA (US)

( * ) Notice: Subject to any disclaimer, the term of this patent is extended or adjusted under 35 U.S.C. 154(b) by 126 days.

(21) Appl. No.: 17/695,712

(22) Filed: Mar. 15, 2022

(65) Prior Publication Data

US 2022/0300687 A1    Sep. 22, 2022

(30) Foreign Application Priority Data

Mar. 16, 2021 (IN) .............................. 202141011081

(51) Int. Cl.
*G06F 30/30* (2020.01)
*G06F 30/31* (2020.01)
*G06F 30/32* (2020.01)
*G06F 30/392* (2020.01)
*G06F 30/398* (2020.01)

(52) U.S. Cl.
CPC .............. *G06F 30/31* (2020.01); *G06F 30/32* (2020.01); *G06F 30/392* (2020.01); *G06F 30/398* (2020.01)

(58) Field of Classification Search
None
See application file for complete search history.

(56) References Cited

U.S. PATENT DOCUMENTS

| | | | | | |
|---|---|---|---|---|---|
| 5,455,775 | A | * | 10/1995 | Huber | G06F 30/392 716/124 |
| 5,999,181 | A | * | 12/1999 | Tezuka | H04L 41/145 715/733 |
| 6,145,117 | A | * | 11/2000 | Eng | G06F 30/3947 716/113 |

(Continued)

*Primary Examiner* — Leigh M Garbowski
(74) *Attorney, Agent, or Firm* — Fenwick & West LLP

(57) ABSTRACT

A system determines physical design information along a logic hierarchy of a circuit design. The system accesses physical design metrics associated with different parts of a physical design of a circuit. The system accesses a logic design of the circuit comprising a hierarchy of logic blocks. The system determines the physical design metrics associated with one or more logic blocks of the hierarchy of the logic design based on a relation between the physical design and the logic design. The system configures a user interface to display the hierarchy of the logic design of the circuit along with the physical design metrics associated with the one or more logic blocks of the hierarchy. The system sends the configured user interface for display.

20 Claims, 26 Drawing Sheets

(56) References Cited

U.S. PATENT DOCUMENTS

| | | | |
|---|---|---|---|
| 7,805,698 B1* | 9/2010 | Ferguson | G06F 30/327 |
| | | | 716/139 |
| 8,214,791 B1* | 7/2012 | O'Riordan | G06F 30/30 |
| | | | 716/139 |
| 8,527,936 B2* | 9/2013 | Jain | G06F 30/33 |
| | | | 716/139 |
| 8,726,224 B1* | 5/2014 | Giangarra | G06F 30/30 |
| | | | 716/132 |
| 9,026,978 B1* | 5/2015 | Liu | G06F 30/327 |
| | | | 716/135 |
| 9,298,868 B2* | 3/2016 | Agrawal | G06F 30/323 |
| 11,663,381 B2* | 5/2023 | Shuma | G06F 30/31 |
| | | | 716/103 |
| 2008/0244501 A1* | 10/2008 | Davison | G06F 30/30 |
| | | | 716/104 |

\* cited by examiner

| RTLCongestionDetailed ▽ ≡ ← → ◇ | *Enter filter expression* | | | | | | |
|---|---|---|---|---|---|---|---|
| Logical Hierarchy | Cell Count | Logic Congestion | Congested Cells | % Congested Cells | % of Tot Congestion | Channel Congestion | Congestion Overflo |
| ▶ alb_cpu_top | 1482082 | 38520 | 57737 | 3.90 | 100.00 | 5 | |
| L Local_Logic | 1135 | 0 | 14 | 1.23 | 0.02 | 0 | |
| M u_alb_cpu | 303350 | 2936 | 5831 | 1.92 | 10.10 | 0 | |
| M u_alb_srams | 52 | 0 | 0 | 0.00 | 0.00 | 0 | |
| M u_vec_top | 1177545 | 35584 | 51892 | 4.41 | 89.88 | 0 | |
| L Local_Logic | 2565 | 0 | 55 | 2.14 | 0.10 | 0 | |
| M u0_vec_slice_group | 121656 | 1556 | 2613 | 2.15 | 4.53 | 0 | |
| M u1_vec_slice_group | 121695 | 1938 | 3062 | 2.52 | 5.30 | 0 | |
| M u2_vec_slice_group | 121853 | 2415 | 3994 | 3.28 | 6.92 | 0 | |
| M u3_vec_slice_group | 121589 | 2643 | 4149 | 3.41 | 7.19 | 0 | |
| M u4_vec_slice_group | 121570 | 2533 | 3909 | 3.22 | 6.77 | 0 | |
| M u5_vec_slice_group | 121595 | 2316 | 3674 | 3.02 | 6.36 | 0 | |
| M u6_vec_slice_group | 121706 | 1746 | 3201 | 2.63 | 5.54 | 0 | |
| M u7_vec_slice_group | 121151 | 1566 | 2706 | 2.23 | 4.69 | 0 | |
| M u0_vec_acc_xbar | 733 | 2 | 4 | 0.55 | 0.01 | 0 | |
| M u1_vec_acc_xbar | 680 | 0 | 5 | 0.74 | 0.01 | 0 | |
| M u_vec_dmp_global | 149752 | 18314 | 23772 | 15.88 | 41.17 | 0 | |
| M u_vec_rams | 877 | 0 | 80 | 9.12 | 0.14 | 0 | |
| M u_vec_decode_pipe | 19789 | 233 | 260 | 1.31 | 0.45 | 0 | |
| M u_vec_ctrl | 11 | 0 | 0 | 0.00 | 0.00 | 0 | |
| M u_vec_scalar | 10420 | 56 | 90 | 0.86 | 0.16 | 0 | |
| M u_vec_predicate_ctrl | 6149 | 41 | 43 | 0.70 | 0.07 | 0 | |
| M u_vec_prf | 9900 | 209 | 254 | 2.57 | 0.44 | 0 | |
| M u_vec_aux_reg | 986 | 6 | 11 | 1.12 | 0.02 | 0 | |
| M u_vec_excpn | 1102 | 7 | 7 | 0.64 | 0.01 | 0 | |
| M u_vec_pc | 1776 | 3 | 3 | 0.17 | 0.01 | 0 | |

FIG. 5

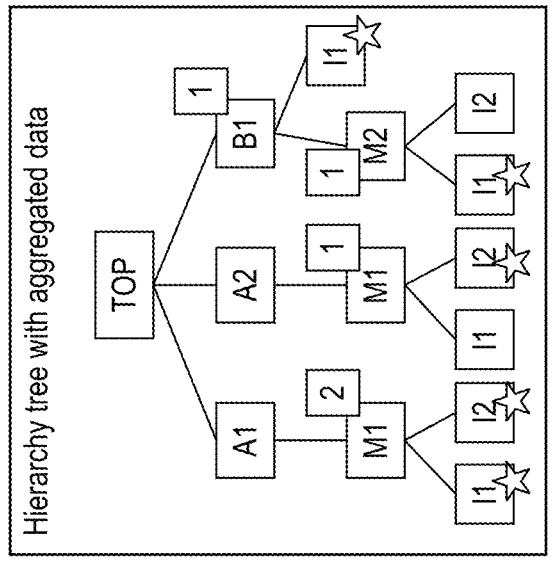
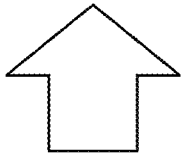
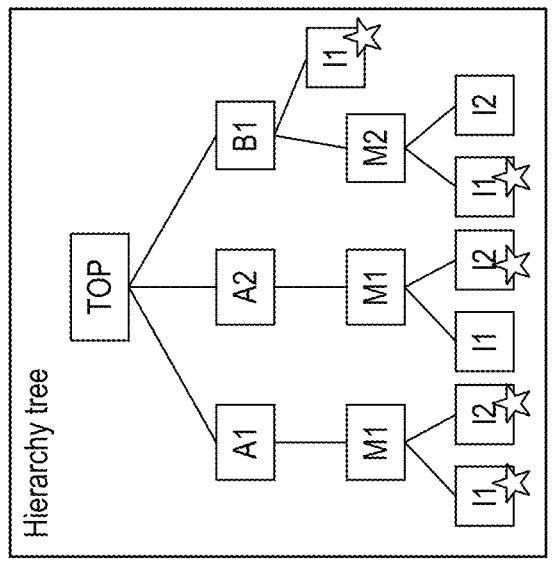
FIG. 6A

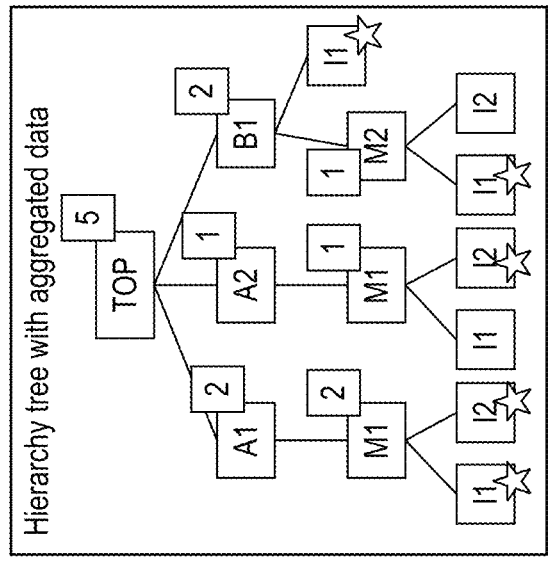
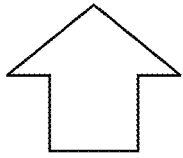
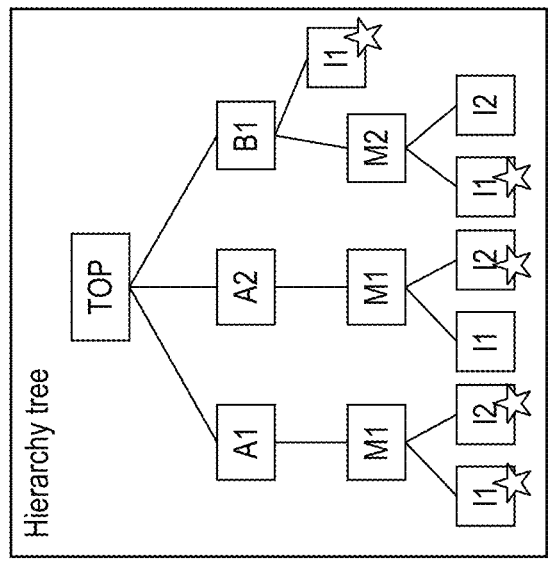
FIG. 6B

| Logical Hierarchy | WINS Tot | TNS Tot | NVP Tot | WNS IO | TNS IO | NVP IO | WNS R2R | TNS R2R | NVP R2R | Logic Lev viol | Path Len Viol | Net Len Viol | ZWL Viol | Bottl Cell |
|---|---|---|---|---|---|---|---|---|---|---|---|---|---|---|
| TOP_CORE | -0.95 | -51.52 | 175 | -0.95 | -32.36 | 108 | -0.74 | -19.16 | 67 | 85 | 94 | 107 | 175 | 67 |
| Local_Logic | -0.40 | -3.82 | 17 | -0.40 | -3.73 | 14 | -0.04 | -0.09 | 3 | 0 | 1 | 7 | 16 | 0 |
| cel | -0.75 | -21.06 | 106 | -0.75 | -12.42 | 68 | -0.43 | -8.64 | 38 | 35 | 42 | 49 | 107 | 33 |
| pe_arb | -0.95 | -26.65 | 52 | -0.95 | -16.21 | 26 | -0.74 | -10.43 | 26 | 50 | 51 | 51 | 52 | 34 |
| Local_Logic | -0.95 | -26.65 | 52 | -0.95 | -16.21 | 26 | -0.74 | -10.43 | 26 | 50 | 51 | 51 | 52 | 18 |
| mult_37 | 0.00 | 0 | 0 | 0.00 | 0.00 | 0 | 0.00 | 0.00 | 0 | 0 | 0 | 0 | 0 | 16 |
| dct_buf0 | | | | | | | | | | | | | | |

FIG. 10

| Logical Hierarchy | WINS Tot | TNS Tot | NVP Tot |
|---|---|---|---|
| TOP_CORE | -0.95 | -51.52 | 175 |
| Local_Logic | -0.40 | -3.82 | 17 |
| cel | -0.75 | -21.06 | 106 |
| pe_arb | -0.95 | -26.65 | 52 |
| Local_Logic | -0.95 | -26.65 | 52 |
| mult_37 | 0.00 | 0 | 0 |
| dct_buf0 | | | |

| Cell Name | Reference | Pin | Origin | Line # |
|---|---|---|---|---|
| pe_arb/mult_37/SGI9_18115 | AO21X1_LVT | 6 | rtl | 37 |
| pe_arb/mult_37/SGI10_18116 | OA21X1_LVT | 6 | rtl | 37 |
| pe_arb | OR2X4_LVT | 5 | datapath | 42 |
| pe_arb | OR2X1_LVT | 5 | datapath | 42 |
| pe_arb | OR2X2_LVT | 5 | datapath | 42 |
| pe_arb | INVX1_LVT | 4 | rtl | 5 |
| pe_arb | OAI222X1_LVT | 9 | rtl | 18 |
| pe_arb | AO22X1_LVT | 7 | datapath | 42 |
| pe_arb | NOR3X2_LVT | 6 | rtl | 28 |
| pe_arb | OAI222X2_LVT | 9 | rtl | 18 |
| pe_arb | INVX2_LVT | 4 | datapath | 42 |
| pe_arb | OR3X1_LVT | 6 | rtl | 28 |
| pe_arb | OA21X1_LVT | 6 | datapath | 42 |
| pe_arb | AND2X1_LVT | 5 | datapath | 42 |
| pe_arb | AO21X1_LVT | 6 | datapath | 42 |
| pe_arb | OR2X2_LVT | 5 | rtl | 5 |

Context menu:
- Configure Views
- Filter
- ECO
- Select Timing Paths
- Schematic View
- Cross Probe to Source Instance
- Show Properties
- User Table (Work List)
- Export
- Copy Text

FIG. 14

| RTLTimingDetailed | | | | | | | | | | | | | | |
|---|---|---|---|---|---|---|---|---|---|---|---|---|---|---|
| Logical Hierarchy | WINS Tot | TNS Tot | WNS IO | TNS IO | WNS R2R | TNS R2R | NVP Tot | NVP IO | NVP R2R | Logic Lev viol | Path Len Viol | Net Len Viol | ZWL Viol | Bottl Cell |
| TOP_CORE | -0.95 | -51.52 | -0.95 | -32.36 | -0.95 | -19.16 | 175 | 108 | 67 | 85 | 94 | 107 | 175 | 67 |
| Local_Logic | -0.40 | -3.82 | -0.40 | -3.73 | -0.09 | -0.09 | 17 | 14 | 3 | 0 | 1 | 7 | 16 | 0 |
| cel | -0.75 | -21.06 | -0.75 | -12.42 | -0.43 | -8.64 | 106 | 68 | 38 | 35 | 42 | 49 | 107 | 33 |
| pe_arb | -0.95 | -26.65 | -0.95 | -16.21 | -0.74 | -10.43 | 52 | 26 | 26 | 50 | 51 | 51 | 52 | 34 |
| Local_Logic | -0.95 | -26.65 | -0.95 | -16.21 | -0.74 | -10.43 | 52 | 26 | 26 | 50 | 51 | 51 | 52 | 18 |
| mult_37 | 0.00 | 0.00 | 0.00 | 0.00 | 0.00 | 0.00 | 0 | 0 | 0 | 0 | 0 | 0 | 0 | 16 |
| dct_buf0 | | | | | | | | | | | | | | |

| RTLTimingPathPysical | | | | | | | | | |
|---|---|---|---|---|---|---|---|---|---|
| slack | arrival | required | num_logic _gates | path_length | net_length | clock_cycles | endpoint _name | startpoint name | path_group _name | endpoint clock_name |
| -0.283433 | 1.568203 | 1.284770 | 10 | 101.91 | 55.30 | 1 | ...reg(11)/D | ...reg(0)/CLK | clk | clk |
| -0.328019 | 1.729588 | 1.401570 | 11 | 104.13 | 42.83 | 1 | ...reg(10)/D | C[2] | REGIN | clk |
| -0.361008 | 1.645584 | 1.284576 | 12 | 105.98 | 57.90 | 1 | ...reg(10)/D | ...reg(0)/CLK | clk | clk |
| -0.188468 | 1.589680 | 1.401212 | 10 | 106.01 | 26.95 | 1 | ...reg(4)/D | ...reg(0)/CLK | clk | clk |
| -0.204060 | 1.605625 | 1.401565 | 11 | 107.65 | 57.90 | 1 | ...reg(8)/D | ...reg(0)/CLK | clk | clk |
| -0.307175 | 1.591721 | 1.284545 | 11 | 108.71 | 57.90 | 1 | ...reg(9)/D | C[1] | REGIN | clk |
| -0.304045 | 1.705403 | 1.401358 | 9 | 110.48 | 41.31 | 1 | ...reg(6)/D | ...reg(0)/CLK | clk | clk |
| -0.164233 | 1.565647 | 1.401414 | 10 | 111.61 | 37.99 | 1 | ...reg(7)/D | ...reg(0)/CLK | clk | clk |
| -0.348359 | 1.632900 | 1.284541 | 12 | 112.68 | 57.90 | 1 | ...reg(11)/D | C[1] | REGIN | clk |
| -0.315436 | 1.716671 | 1.401235 | 12 | 114.15 | 24.82 | 1 | ...reg(7)/D | ...reg(0)/CLK | clk | clk |
| -0.241517 | 1.642880 | 1.401363 | 9 | 114.26 | 41.31 | 1 | ...reg(5)/D | ...reg(0)/CLK | clk | clk |
| -0.211107 | 0.911106 | 0.699999 | 9 | 114.75 | 113.72 | 1 | dout1 | ...reg(0)/CLK | REGOUT | clk |
| -0.416000 | 1.817526 | 1.401536 | 11 | 115.50 | 41.31 | 1 | ...reg(8)/D | C[1] | REGIN | clk |
| -0.264197 | 1.665440 | 1.401243 | 12 | 116.22 | 24.29 | 1 | ...reg(5)/D | ...reg(0)/CLK | clk | clk |
| -0.181434 | 1.582585 | 1.401151 | 14 | 119.96 | 30.63 | 1 | ...reg(3)/D | ...reg(0)/CLK | clk | clk |
| -0.343587 | 1.745152 | 1.401566 | 14 | 120.66 | 42.83 | 1 | ...reg(11)/D | C[2] | REGIN | clk |

FIG. 16

| RTLTimingDetailed ▽ | = | ↓ → ⊗ | Enter filter expression |

| Logical Hierarchy | WNS Tot | TNS Tot | NVP Tot | WNS IO | TNS IO | NVP IO | WNS R2R | TNS R2R | NVP R2R | Logic Lev viol | Path Len Viol | Net Len Viol | ZWL Viol | Bottl Cell |
|---|---|---|---|---|---|---|---|---|---|---|---|---|---|---|
| T▸TOP_CORE | -0.95 | -51.52 | 175 | -0.95 | -32.36 | 108 | -0.74 | -19.16 | 67 | 85 | 94 | 107 | 175 | 67 |
| L cel | -0.40 | -3.82 | 17 | -0.40 | -3.73 | 14 | -0.04 | -0.09 | 3 | 0 | 1 | 7 | 16 | 0 |
| M pe_arb | -0.75 | -21.06 | 106 | -0.75 | -12.42 | 68 | -0.43 | -8.64 | 38 | 35 | 42 | 49 | 107 | 33 |
| L Local_Logic | -0.95 | -26.65 | 52 | -0.95 | -16.21 | 26 | -0.74 | -10.43 | 26 | 50 | 51 | 51 | 52 | 34 |
| M mult_37 | -0.95 | -26.65 | 52 | -0.95 | -16.21 | 26 | -0.74 | -10.43 | 26 | 50 | 51 | 51 | 52 | 18 |
| HM dct_buf0 | 0.00 | 0.00 | 0 | 0.00 | 0.00 | 0 | 0.00 | 0.00 | 0 | 0 | 0 | 0 | 0 | 16 |

| RTLTimingPathPysical ▽ | = | ↓ → ⊗ | Enter filter expression |

| NL Viol | | | | | | | | | | | |
|---|---|---|---|---|---|---|---|---|---|---|---|
| slack | arrival | required | num_logic_gates | path_length | net_length | clock_cycles | endpoint_name | startpoint_name | path_group_name | endpoint_clock_name |
| -0.307285 | 1.592179 | 1.284894 | 11 | 37.82 | 11.64 | 1 | ..._reg(11)/D | ..._reg(5)/CLK | clk | clk |
| -0.312292 | 1.012291 | 0.699999 | 0 | 15.80 | 15.80 | 1 | dout2[3] | ..._reg(3)/CLK | REGOUT | clk |
| -0.313823 | 1.598702 | 1.284879 | 12 | 61.04 | 20.09 | 1 | ..._reg(10)/D | ..._reg(2)/CLK | clk | clk |
| -0.259917 | 1.544819 | 1.284902 | 11 | 58.80 | 20.09 | 1 | ..._reg(9)/D | ..._reg(2)/CLK | clk | clk |
| -0.233232 | 1.518040 | 1.284808 | 10 | 60.25 | 20.09 | 1 | ..._reg(8)/D | ..._reg(2)/CLK | clk | clk |
| -0.264197 | 1.591721 | 1.401243 | 13 | 116.22 | 24.29 | 1 | ..._reg(5)/D | ..._reg(0)/CLK | clk | clk |
| -0.315436 | 1.716671 | 1.401235 | 12 | 114.15 | 24.82 | 1 | ..._reg(7)/D | ..._reg(0)/CLK | clk | clk |
| -0.188468 | 1.589680 | 1.401212 | 10 | 106.01 | 26.95 | 1 | ..._reg(4)/D | ..._reg(0)/CLK | clk | clk |
| -0.181434 | 1.582585 | 1.401151 | 12 | 119.90 | 30.63 | 1 | ..._reg(3)/D | ..._reg(0)/CLK | clk | clk |
| -0.164233 | 1.565647 | 1.401414 | 10 | 111.61 | 37.99 | 1 | ..._reg(7)/D | ..._reg(4)/CLK | clk | clk |
| -0.749234 | 2.102647 | 1.401440 | 18 | 206.96 | 38.25 | 1 | ..._reg(0)/D | C[5] | REGIN | clk |
| -0.701087 | 2.102647 | 0.401560 | 17 | 187.80 | 38.25 | 1 | ..._reg(1)/D | C[5] | REGIN | clk |
| -0.618471 | 2.020020 | 1.401549 | 16 | 188.41 | 38.25 | 1 | ..._reg(2)/D | C[5] | REGIN | clk |
| -0.226355 | 1.627526 | 1.401171 | 10 | 178.32 | 38.25 | 1 | ..._reg(4)/D | C[5] | REGIN | clk |
| -0.326355 | 1.728539 | 1.401486 | 12 | 146.21 | 39.00 | 1 | ..._reg(9)/D | C[9] | REGIN | clk |
| -0.416000 | 1.817536 | 1.401536 | 11 | 115.50 | 41.34 | 1 | ..._reg(8)/D | C[1] | REGIN | clk |

FIG. 17

| Logical Hierarchy | WINS Tot | TNS Tot | NVP Tot | WNS IO | TNS IO | NVP IO | WNS R2R | TNS R2R | NVP R2R | Logic Lev viol | Path Len Viol | Net Len Viol | ZWL Viol | Bottl Cell |
|---|---|---|---|---|---|---|---|---|---|---|---|---|---|---|
| T TOP_CORE | -0.95 | -51.52 | 175 | -0.95 | -32.36 | 108 | -0.74 | -19.16 | 67 | 85 | 94 | 107 | 175 | 67 |
| L Local_Logic | -0.40 | -3.82 | 17 | -0.40 | -3.73 | 14 | -0.04 | -0.09 | 3 | 0 | 1 | 7 | 16 | 0 |
| M cel | -0.75 | -21.06 | 106 | -0.75 | -12.42 | 68 | -0.43 | -8.64 | 38 | 35 | 42 | 49 | 107 | 33 |
| M pe_arb | -0.95 | -26.65 | 52 | -0.95 | -16.21 | 26 | -0.74 | -10.43 | 26 | 50 | 51 | 51 | 52 | 34 |
| L Local_Logic | -0.95 | -26.65 | 52 | -0.95 | -16.21 | 26 | -0.74 | -10.43 | 26 | 50 | 51 | 51 | 52 | 18 |
| M mult_37 | | | | | | | | | | | | | | |
| HM dct_buf0 | 0.00 | 0 | 0 | 0.00 | 0.00 | 0 | 0.00 | 0.00 | 0 | 0 | 0 | 0 | 0 | 16 |

FIG. 18

PROPAGATING PHYSICAL DESIGN INFORMATION THROUGH LOGICAL DESIGN HIERARCHY OF AN ELECTRONIC CIRCUIT

CROSS REFERENCE TO RELATED APPLICATIONS

This application claims the benefit of Indian Provisional Application No. 202141011081, filed Mar. 16, 2021, which is incorporated by reference in its entirety.

TECHNICAL FIELD

The present disclosure relates to design of electronic circuits in general and more specifically to propagating physical design information through a logical design hierarchy of a circuit.

BACKGROUND

Designing a very large scale integrated (VLSI) circuit is a complex process. At a high level the design process is divided into two parts, the front end part and the back end part. These two parts are typically performed by different designers, the front end designer and the back end designer respectively. The front end designer develops the design using a hardware description language (HDL) description of the design. The front end designer uses the HDL to write a register transfer level (RTL) description for the design. The RTL is synthesized into a gate level netlist.

The back end (or physical) designer takes the gate level netlist and works on the physical aspects of the design implementation including floorplanning, placement, and routing. A floorplanned design includes a core boundary, input/output pads, placement of all cells and global route result. An implemented design has all floorplanning results, but it also has a fully optimized physical design and a higher quality placement and detailed routed result. Furthermore, detailed analysis can be performed based on the higher quality placement and detailed routed result, for example, congestion analysis, timing analysis, and so on.

SUMMARY

A system determines physical design information along a logic hierarchy of a circuit design. The system accesses physical design metrics associated with different parts of a physical design of a circuit. The system accesses a logic design of the circuit comprising a hierarchy of logic blocks. The system determines the physical design metrics associated with one or more logic blocks of the hierarchy of the logic design based on a relation between the physical design and the logic design. The system configures a user interface to display the hierarchy of the logic design of the circuit along with the physical design metrics associated with the one or more logic blocks of the hierarchy. The system sends the configured user interface for display.

According to an embodiment, the system determines congestion metrics indicating a degree of congestion in various portions of the circuit. According to an embodiment, the metric aggregates timing data for nets associated with a logic block of the logic hierarchy. Other examples of metrics determined along the logic hierarchy include logic level violation, bottleneck cell count, path length violation, net length violation, and so on.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

FIG. 5 illustrates example of congestion metrics overlaid on the logical hierarchy according to an embodiment.

FIG. 6A illustrates congestion cell metric local data according to an embodiment.

FIG. 6B illustrates congestion cell metrics propagated up the tree according to an embodiment.

FIG. 10 illustrates logical hierarchy tree for timing metrics according to an embodiment.

FIG. 11 illustrates logical hierarchy tree for timing metrics (WNS, TNS and NVP) according to an embodiment.

Figure 13:
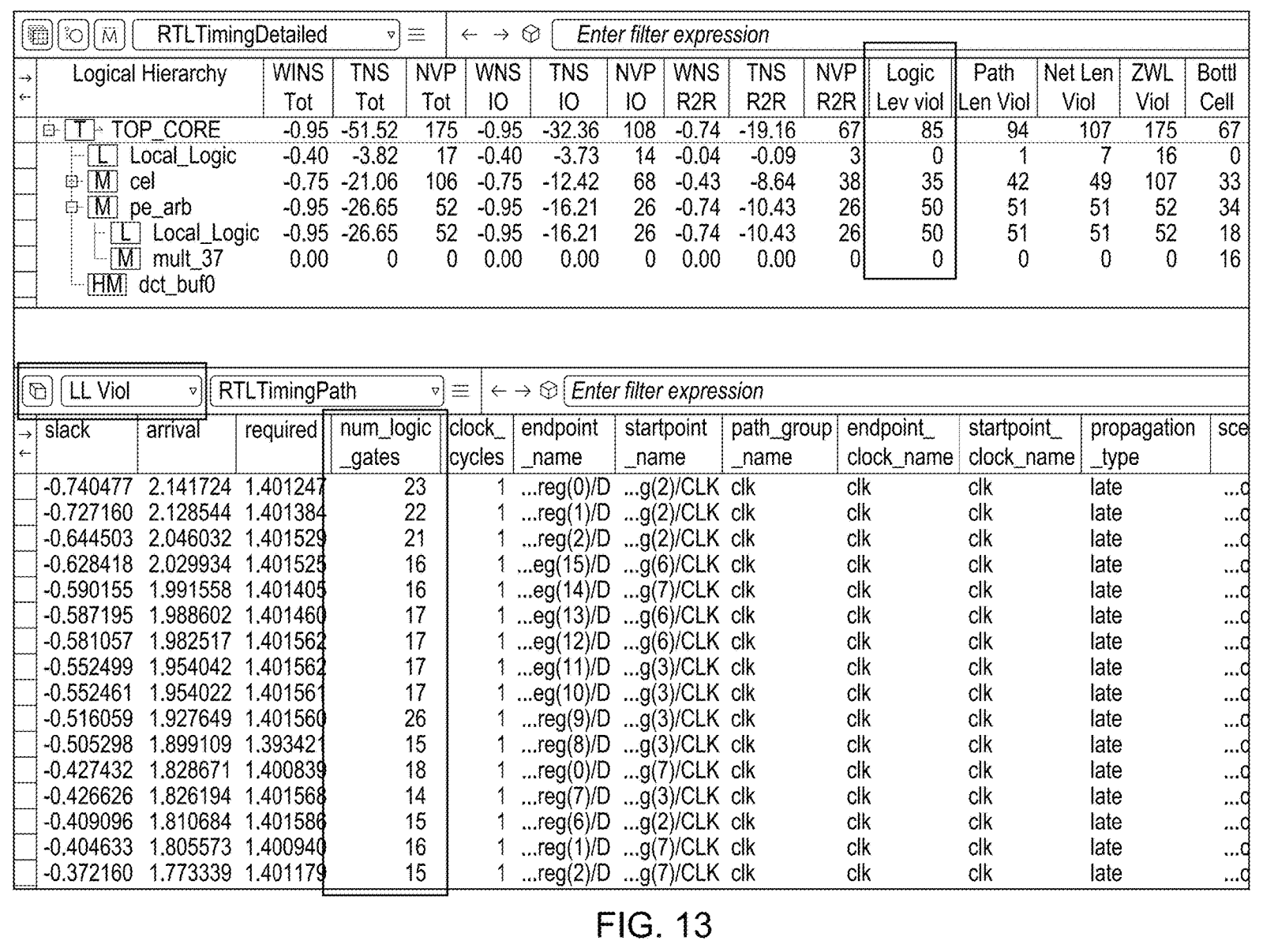

FIG. 13 illustrates timing metrics (logic level violations) propagated along the hierarchy according to an embodiment.

FIG. 14 illustrates selecting timing paths of bottleneck cells according to an embodiment.

FIG. 16 illustrates identification of path length violations per hierarchy according to an embodiment.

FIG. 17 illustrates net length violation identification according to an embodiment.

FIG. 18 illustrates identification of paths when using a zero-interconnection model according to an embodiment.

DETAILED DESCRIPTION

Figure 1:
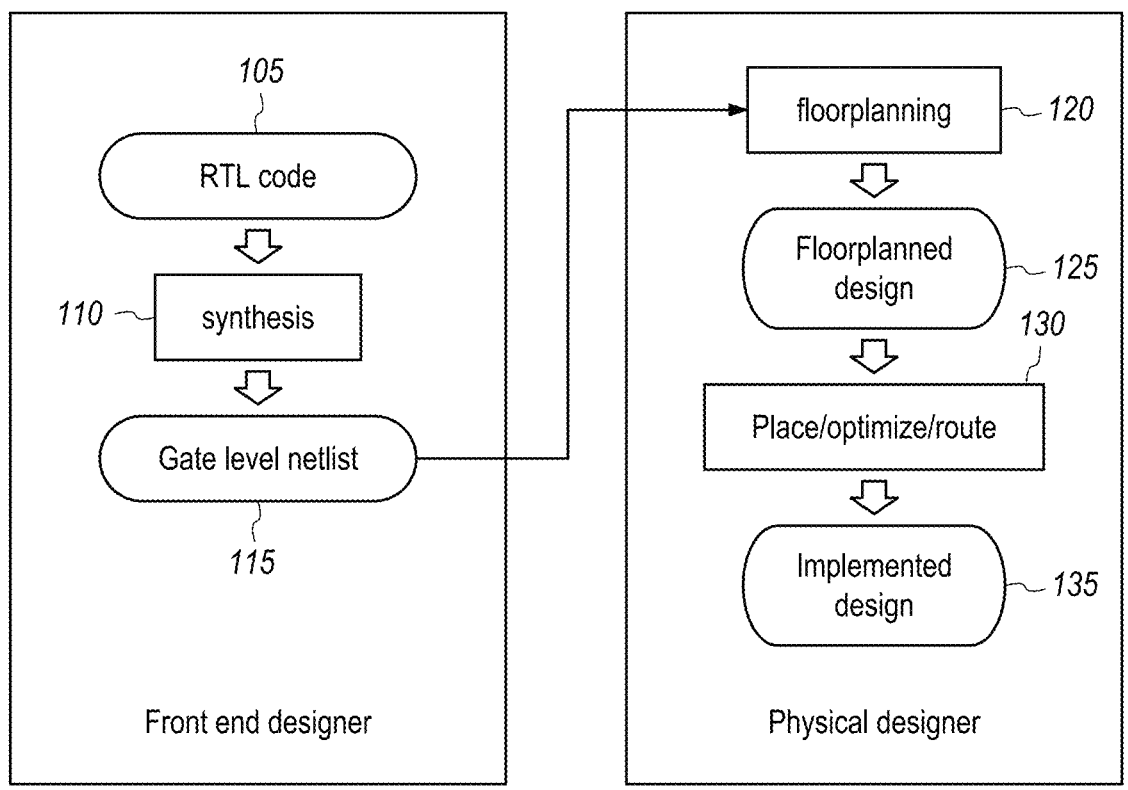
FIG. 1 illustrates traditional front end versus physical design activities, according to an embodiment.

At a high level, the circuit design process is divided into two parts, the front end or logical design and the back end or physical design, as shown in FIG. 1. During the circuit design process, the circuit design is analyzed using different representations including: (1) a front end logical representation, for example, using RTL and (2) a back end physical representation that is used for performing placement and routing. The results of the back end physical design are accessible to the back end physical designers but not easily accessible to the front end HDL designers. The front end designers see the design using an RTL representation and not at the physical design level. The front end designers do not analyze the circuit at the layout level. As shown in FIG. 1, using conventional techniques, the front end designer only has congestion and timing information based on the netlist and does not have corresponding analysis information from the physical design level. The front end designers perform synthesis 110 using the RTL code 105 to generate gate level netlist 115.

The system according to an embodiment, analyzes the circuit design using the physical representation to generate various physical design metrics, for example, metrics based on congestion information or timing information. These metrics are generated in the context of the physical design, for example, the metric values are determined for various portions of the physical design. The system converts the metric information for use with the logic design. For example, the system determines the relation of the metric information to the corresponding RTL components. The system further propagates the metric information to various levels of logic design hierarchy.

As a result, the metrics determined at the physical design level are made available using a user interface to front end designers via a logic design hierarchy. A front end designer can inspect the circuit design using a logic design hierarchy to determine the physical design metric values at various logical nodes and at various levels of the logical design hierarchy. For example, the front end designer can identify various physical design bottlenecks at a logical level. This allows the front end designer to modify the circuit design at a logical level if necessary to achieve improvements in metrics at the physical design level. For example, a front end designer can identify logical components that cause congestion at the physical design level and modify these components so that the congestion metrics are improved at the physical design level.

More specifically, a back end physical designer analyzes a circuit design after the floorplanning step 120 (FIG. 1) that generates a floorplanned design 125. The physical designer performs the placement, optimization, and routing 130 steps to generate the implemented design 135. when the design has placement and global routing information after the placement and routing step 130. Using this physical design information, the circuit design can be accurately analyzed for issues related to congestion and timing.

Figure 2A:
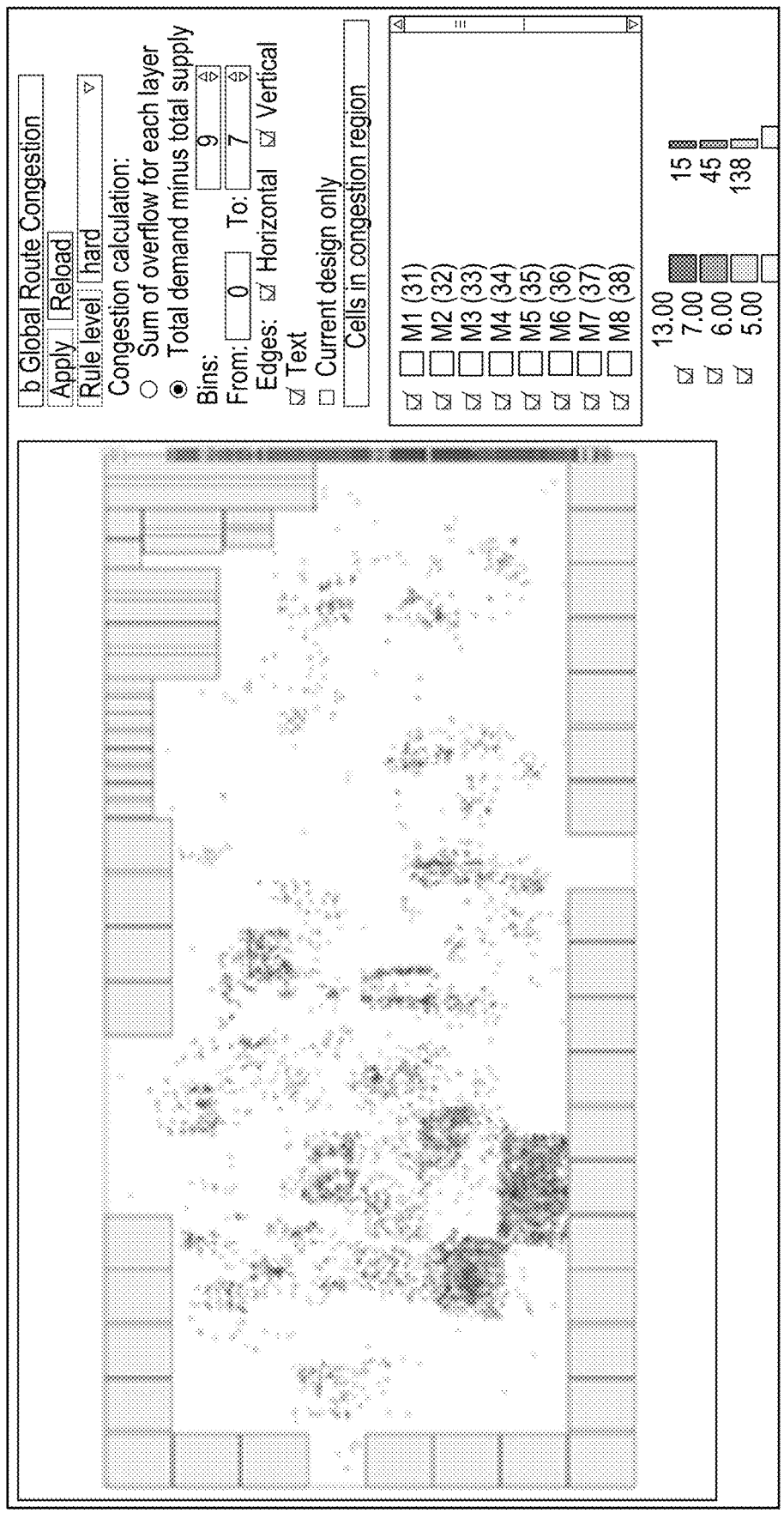
FIG. 2A illustrates a layout view with a congestion map which indicates areas of routing congestion.

FIG. 2A illustrates a layout view with a congestion map which indicates areas of routing congestion. For congestion, the system presents a congestion map (example in FIG. 2A) which shows areas of congestion. This allows the back end designer to check for causes of this congestion within the physical design. For example, the back end designer can check if congestion is in an area of high cell density or if congestion is in an area with several hard macros (i.e. RAMs). Based on this analysis, the back end designer can make changes to the physical design, for example, adding partial blockages to reduce the cell density or adding placement blockages to force cells to avoid the hard macro area.

Figure 2B:
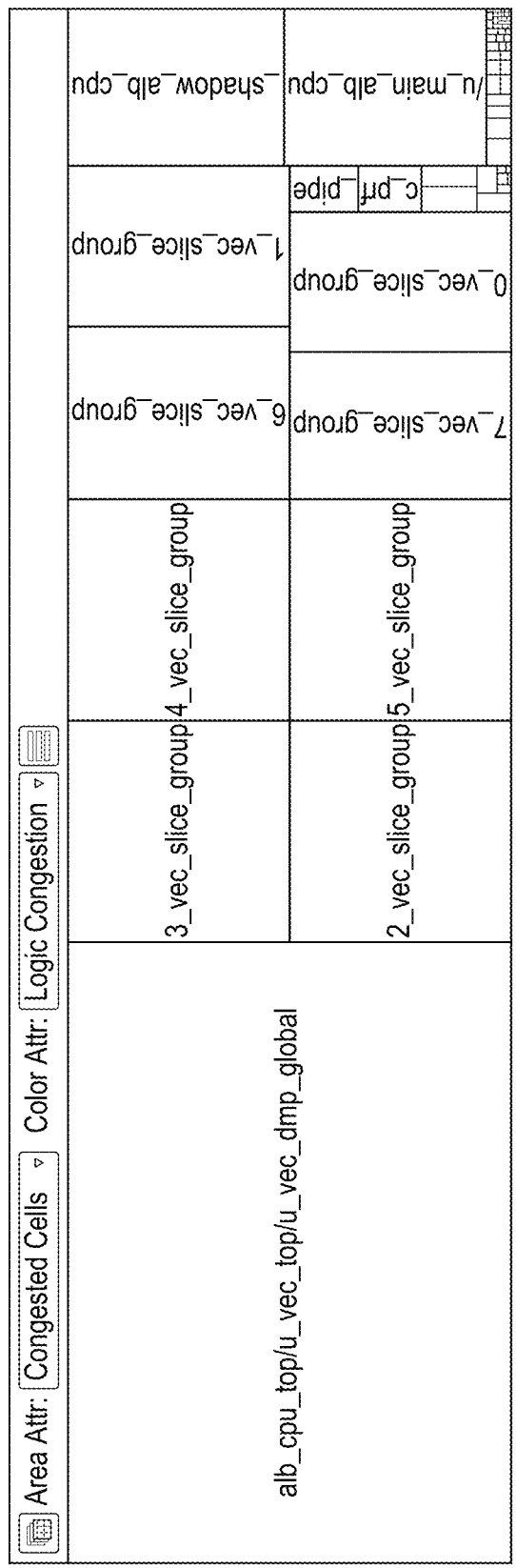
FIG. 2B illustrates a tree view according to an embodiment.

The system takes the physical congestion and timing data from a design after the floorplanning step 120 (as used by physical designers) and converts that data into forms suitable for the front end designer. The floorplanning may be performed using an implementation quality back-end tool and is therefore highly accurate. The synthesis step 110 may also be performed using an implementation quality engine. The format for front end designers is the circuit design hierarchy browser table. However other formats like a tree view can also be supported (see PIG. 2B). FIG. 2B illustrates a tree view according to an embodiment. Also, the system may allow raw usage of the data at the user scripting language level (e.g. Tool Command Language (TCL)). In some embodiments, the system uses the same back-end tool that the back-end designer uses (i.e., implementation quality tools) and presents the same back-end information generated by those tools. In other embodiments, back-end processes may be approximated by faster running tools, so long as the back-end information correlates sufficiently with the actual back-end information generated by the implementation quality back-end tools. The physical design information may be generated using tools other than the full back-end tool. For example, tools may generate back-end data that is not used for final sign off but is accurate enough to provide physical design metrics.

The RTL designer writes RTL code which is synthesized into modules. These modules are instantiated as hierarchical cells into the design and these cells create a logic hierarchy (LH) tree of cell instances. The system provides cingestion/timing data to RTL designers based on these objects that RTL designers use, for example, modules and logic hierarchy tree of cell instances.

Figure 3:
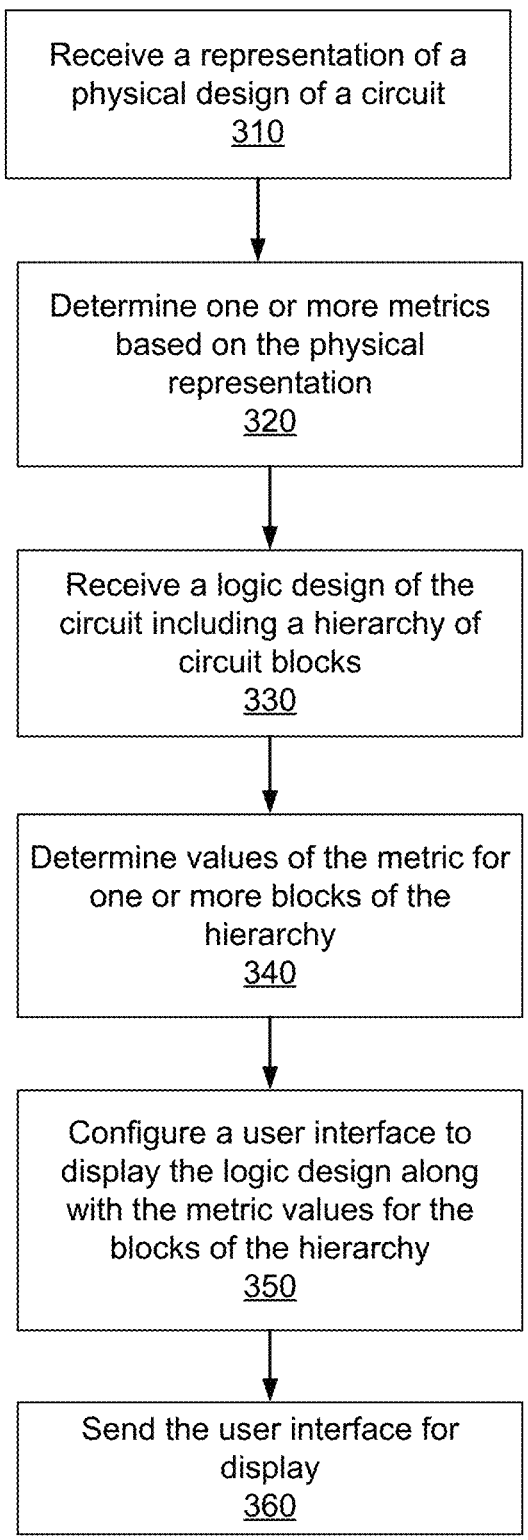
FIG. 3 shows a flowchart illustrating the overall process for propagating physical design metrics along the logic design hierarchy according to an embodiment.
Figure 4:
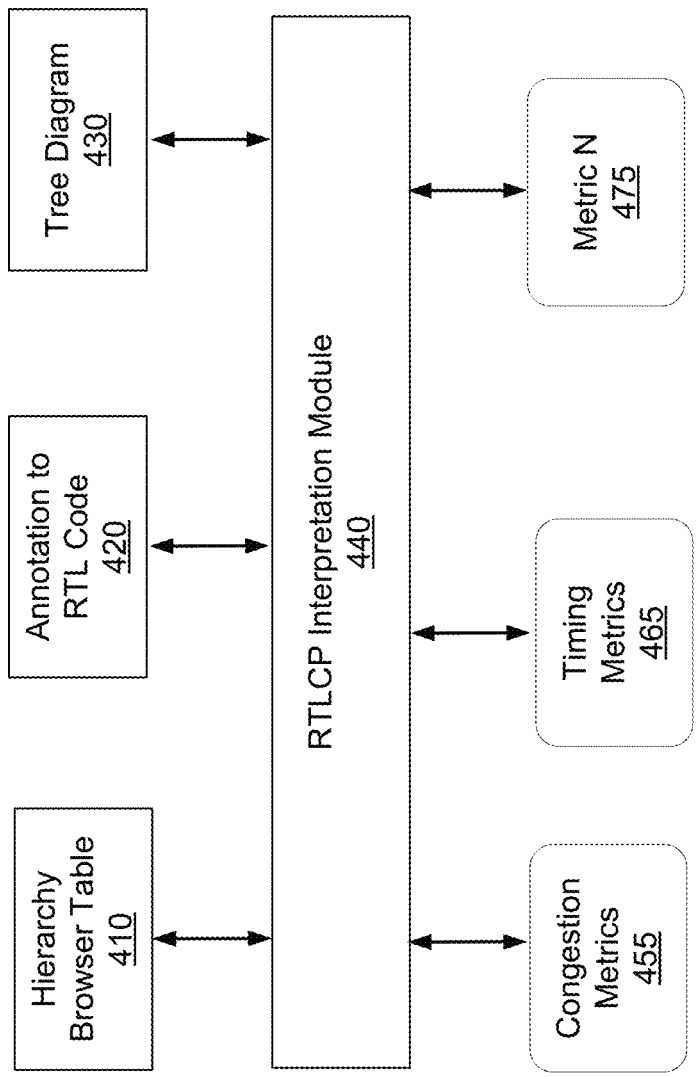
FIG. 4 illustrates three layers for metric display.

FIG. 3 shows a flowchart illustrating the overall process for propagating physical design metrics along the logic design hierarchy according to an embodiment. The system receives 310 a representation of a physical design of a circuit. The system determines 320 values of a metric based on the physical representation for various portions of the physical design of the circuit, for example, metric indicating congestion or timing data. The system receives 330 a logic design of the circuit comprising a hierarchy of blocks. The system determines 340 the metric value for one or more blocks of the hierarchy of the logic design. The system obtains a mapping from the logical design to the physical design. For example, the system obtains the mapping from circuit blocks at the logic level, for example, RTL level and identifies the components at the physical level corresponding to the circuit block. The system aggregates the metrics (e.g., congestion metrics) associated with the physical components at the physical design level to obtain corresponding metrics at the circuit block level at the logical design. The system propagates the metrics along the hierarchy, for example, the system aggregates the metrics at the smaller circuit blocks below a higher level circuit block to obtain aggregate metrics for the higher level circuit block. For example, there may be a set S of circuit blocks below a circuit block C. The system aggregates congestion metrics across the set S of circuit blocks to obtain congestion metrics for the circuit block C. The system configures 350 a user interface to display the hierarchical logic design of the circuit along with the metric values for the one or more blocks of the hierarchy and sends 360 the configured user interface for display FIG. 4 illustrates three layers for metric display. The module (or software layer) between the raw congestion and timing metrics and the hierarchy browser is called the RTLCP (register transfer layer cockpit) interpretation module 440 (FIG. 4). This layer takes the physical data and divides it into portions corresponding to logical hierarchies and to RTL lines of code which are then displayed in hierarchy browser 410 (FIG. 5). The data can also be available for user scripting language (e.g. TCL) and other GUI (graphical user interface) purposes. The congestion metrics propagated along the hierarchy may also be displayed an annotations of RTL code 420 or using a tree diagram 430.

According to an embodiment, the system generates congestion metrics 455, timing metrics 465, and other metrics 475 at the physical design level. The system determines certain congestion metrics that are cell based. In other words, they are associated with certain leaf cells in the design. These cells are then grouped by their owning logical hierarchies and aggregate data on these cells is propagated up the hierarchy tree. This allows quick access by hierarchy browser. FIG. 5 shows a user interface displaying the various metrics, for example, cell count, logic congestion, congested cells, % congested cells, % of total congestion, channel congestion, congestion overflow, and so on determined for various logic blocks along the logic hierarchy and displayed.

FIGS. 6A & 6B show an example of how leaf cell data is propagated up a hierarchy tree. FIG. 6A illustrates congestion cell metric local data according to an embodiment. FIG. 6B illustrates congestion cell metrics propagated up the tree according to an embodiment. On left hand side of FIG. 6A, certain cells that are marked with a star are cells of interest. FIG. 6A shows the local data. A hierarchy local metric means the metric only depends on local data meaning cells directly inside the hierarchy. For example, the hierarchy node, TOP/B1 has 1 starred local cell (TOP/B1/11) in it. The system computes aggregated hierarchical data, where the aggregated data considers all the cells inside a node plus its children. The aggregation operation can be "sum," in other words the sum of value of node plus its children. The aggregation operation can be the minimum value or maximum value. An example of sum aggregation is shown in FIG. 6B. On the left hand side of FIG. 6B certain cells are marked with a star, which are cells of interest. On right hand side, the propagation of cell counts from leaf cells to the top level of the hierarchy tree is shown. For example, the node TOP/B1 has 2 cells in it with stars (TOP/B1/11 and TOP/B1/M2/11), the node TOP which represents the entire design has 5 nodes in it with stars. This aggregated data is displayed in hierarchy browser as shown in FIG. 5. This data can be stored along with the hierarchy for efficient retrieval.

The system may compute several congestion metrics. For example, the system may determine total congested cells by finding all the cells in congested area of the design and groups those cells by hierarchy. Then with hierarchy aggregation computation, the system sends the data for displaying aggregated information into the hierarchy browser.

The system may determine logical congestion cells by finding all the cells in congested areas in design. Out of those cells, the system determines which cells are part of a logic structure which is known to create congestion such as a multiplexer or XOR structures. The system performs a grouping similar to total congested cells and displays congestion metric information for this type of congested cell. Before the synthesis step, the system knows that certain RTL structures may create congestion (e.g. multiplexers or XORs). During the synthesis step the system keeps track of the cells that are synthesized from these RTL structures. The system determines channel congestion cells by finding all the cells in congested areas in design. Out of those cells, the system determines which ones are placed inside a channel area. The system performs a grouping similar to total congested cells and displays metric for a particular type of congested cell. Note that this metric is a physical issue rather than a logical issue so for an RTL designer this allows them to know these cells are not something to be concerned about The system determines following congestion metrics that are hierarchy or RTL module based. In other words, these metrics depend on all the cells belonging to that hierarchy (including children). Since these metrics are based on all the cells of a hierarchy the system may not propagate these metrics up the hierarchy tree like shown in FIG. 6B. These are not local metrics but are hierarchical metrics.

Figure 7:
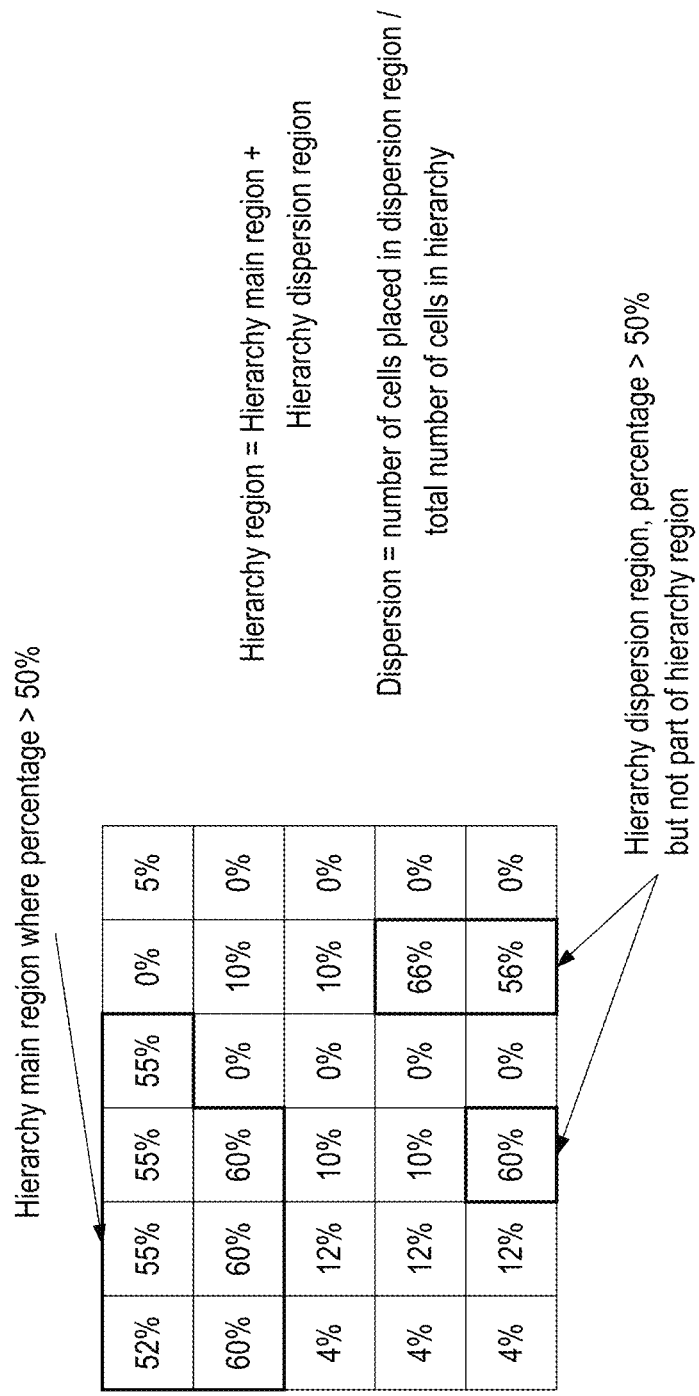
FIG. 7 illustrates propagation of a metric dispersion along the logic hierarchy according to an embodiment.

FIG. 7 illustrates propagation of a metric dispersion along the logic hierarchy according to an embodiment. A metric dispersion is used to determine how close together the cells of the logic hierarchy are placed. For certain modules where the logic is closely related, it is important that the dispersion be low. For other modules, it is not important as these modules are glue logic that is used to manage communications between various other modules.

To compute this metric, the system divides up the design into a 2-dimensional grid. Each grid element is a fixed sized and is larger than cell elements. For each grid element the system determines the percentage area of the grid which is occupied by cells belonging to the hierarchy and its children. If the percentage area of a grid belonging to the hierarchy is larger than a user defined value, percent_in_region, then the system determines that the grid belongs to the hierarchy. This defines a set of grids that belong to the hierarchy called the "hierarchy region". The system finds the largest contiguous region R in the grid belonging to the hierarchy. This is called the "hierarchy main region." Then any other grid elements belonging to the hierarchy, not in R are marked as part of the "hierarchy dispersion region." The hierarchy dispersion region does not need to be contiguous. The dispersion value is the percentage of cells placed in the hierarchy dispersion region divided by the total number of cells in the hierarchy. FIG. 7 shows an example of dispersion where the percent_in_region>50%.

Figure 8:
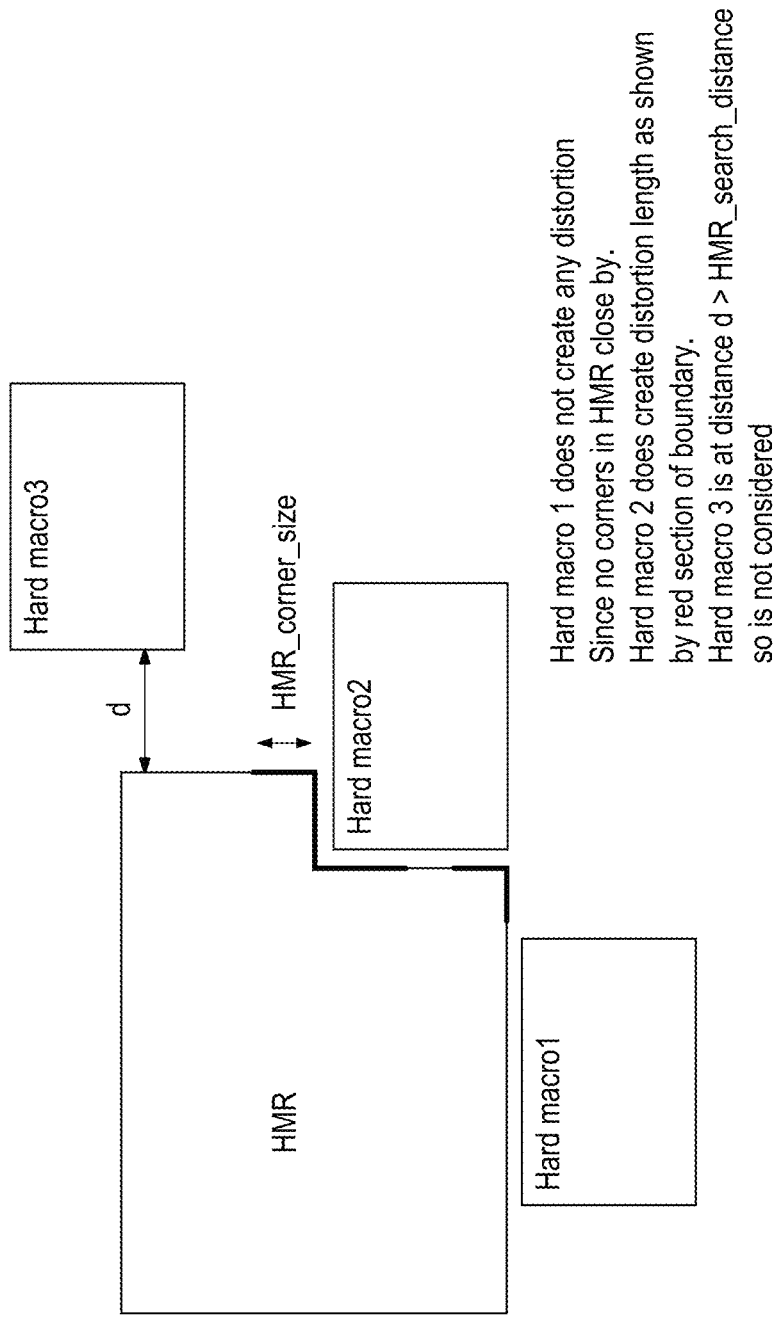
FIG. 8 illustrates distortion propagated along logic hierarchy according to an embodiment.
Figure 9:
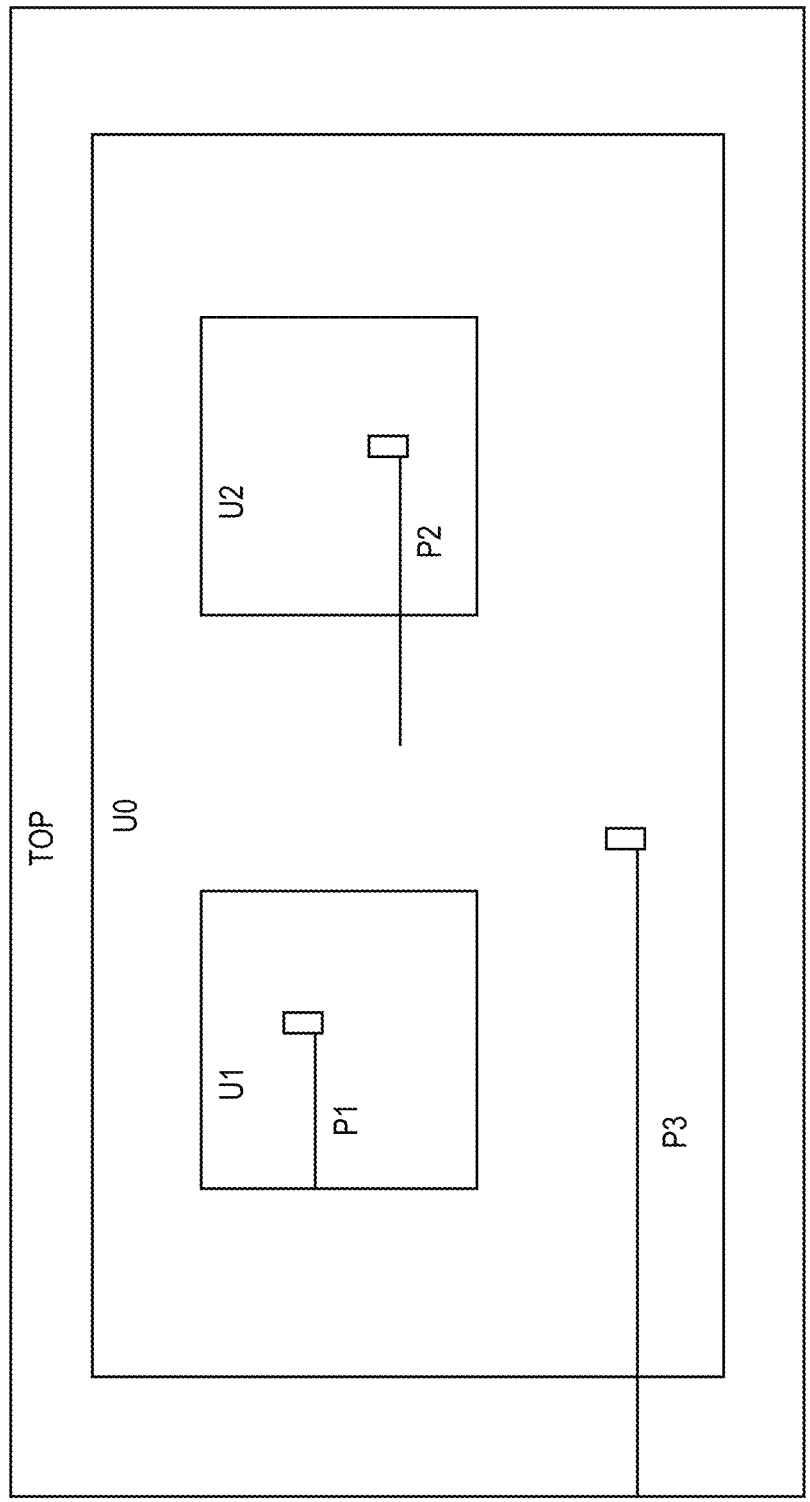
FIG. 9 illustrates timing path in hierarchies according to an embodiment.

A metric distortion is used to determine if the placement of a logic hierarchy was artificially distorted by hard macros. FIG. 8 illustrates distortion propagated along logic hierarchy according to an embodiment. The system processes the hierarchy main region (HMR) of the logic hierarchy as described above. The system examines the area outside HMR within a certain distance (for example, HMR_search_distance) to determine if there are hard macros close to the HMR. The system examines the shape of the HMR which is close to hard macros. If there are any corners in the HMR shape in that area, then the system distorts up to distance=HMR_corner_size of length from the corner. The system determines the distortion value as the sum of the distortion length or as a percentage of the total HMR boundary length. The system determines the distortion value along the logic hierarchy.

The system determines a metric global/local nets indicating how a logic hierarchy is contributing to a congestion spot. Consider a congestion hot spot. This is an area in the design layout which has high congestion. Consider the nets which route through the hot spot, lets call them hot_spot_nets. The hot_spot_nets have pins. These pins are placed either in the hot spot or not in the hot spot. Nets with >=1 pin in the hot spot are called local nets. Nets without pins in the hot spot are called global nets. The system categorizes the hot_spot_nets and assigns them to logical hierarchies. If a hot_spot_net has a pin in logic hierarchy L then that net is assigned to L. Since a net can have many pins, one net can be assigned to many logic hierarchies. The number of global nets assigned to logic hierarchy L is the local value for L for global nets. The number of local nets assigned to logic hierarchy L is the local value for L for local nets. To compute hierarchical values, the system uses the summing aggregation method described previously.

The system uses the physical floorplan data with implementation quality tools to give feedback to the RTL designer that is more accurate than conventional techniques which just use netlist analysis. Logic congestion reported by the system using implementation synthesis engine netlist and implementation congestion map significantly reduces the number of false positives compared with prior art solutions, pre-floorplan, pre-placement which are not implementation accuracy synthesis engines-based solutions.

The system enables RTL designer to make RTL changes which are needed to make RTL implementation ready.

Logical hierarchy-based reporting of congestion metrics performed by the system enables hierarchy based analysis of congestion and taking actionable steps in RTL for the appropriate modules.

The system analyzes timing metrics to indicate the contribution of each logical hierarchy in the design to the overall timing violation in the design. For a violating timing path, the hierarchy owning the endpoint, counts the timing metrics numbers from that violating timing path. The system aggregates for a hierarchy, all the timing paths ending in that hierarchy. The system propagates the metrics data up to the hierarchies above and aggregates it along with the local metrics data from the hierarchies above.

The system may implement different aggregation operation for different metrics types. For some metrics, it can be addition operator. For some metrics it can be minimum operator.

The metrics data can be different for different scenarios. So, the hierarchy tree with metrics data is computed by the system for each of the scenarios.

Some timing metrics computed by the system for the logical hierarchy are as follows. (1) WNS, TNS, NVP: For each logical hierarchy, the system computes the worst negative slack (WNS), total negative slack (TNS), and number of violating endpoints (NVP). In addition, the violating paths in each logical hierarchy are categorized into register-to-register and I/O paths. The I/O paths include input-to-register, register-to-output, and input-to-output paths. (2) Logic level violations: A logic-level violation occurs when the number of logic levels for a negative slack endpoint exceeds a certain threshold. Each hierarchy captures the number of timing paths violating the logic level threshold. This threshold is configurable. The threshold configuration can be per path-group or clock. The logic level threshold per path can also be auto derived. The system determines the logic level threshold using the endpoint clock frequency or the required time of a violating timing path and the nominal delay of a mid-sized buffer. The system estimates the logic level threshold for this path to be the fraction of the required time over the nominal delay. This gives a better estimate of the feasibility of the path, since paths with lower required times have a tighter logic level threshold. (3) Bottleneck cell count: A cell is considered a bottleneck when the number of negative slack paths through it exceeds a certain threshold. Each logical hierarchy captures the number of bottleneck cells inside. The threshold is configurable. To quickly converge on the timing paths going through a bottleneck cell, the system allows a user to select a bottleneck cell and click a menu item to highlight the through timing paths. (4) Path length violation: A path-length violation occurs when a timing violating path is longer than a certain threshold in micron. Each hierarchy captures the number of timing paths violating the path length threshold. User can configure this threshold to global value, or it can be based on per path-group or clock. (5) Net length violation: A net-length violation occurs when a timing violating path has an unbuffered net longer than a certain threshold in microns. Each hierarchy captures the number of timing paths violating the net length threshold. This threshold can be auto-derived based on the length a medium sized buffer can drive for the technology. This threshold is also configurable. The threshold configuration can be a global value, or it can be per path-group or clock. (6) Zero-wire-load violations: A zero-wire-load violation occurs when an endpoint has negative slack when considering zero wire load (zero capacitance and zero net delay). These paths are unlikely to meet timing when the design is implemented and need to be fixed at the RTL level. Paths with zero-wire-load violations can be detected using a zero-wire-load timing computation, and the metric can be grouped using the hierarchy of the corresponding endpoint.

Logical hierarchy-based reporting of timing metrics enables hierarchy-based analysis of timing violations and taking actionable steps in RTL for the appropriate modules.

Figure 12:
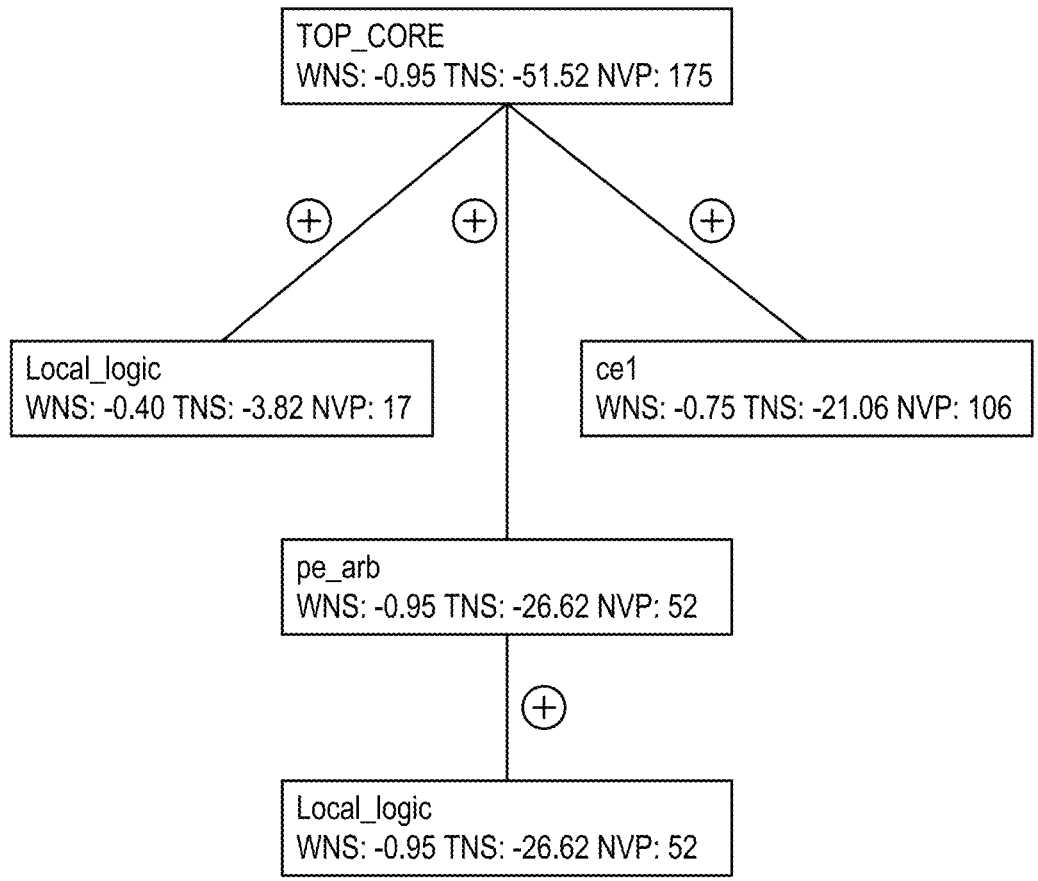
FIG. 12 illustrates propagation of the WNS, TNS and NVP metrics numbers up the logic hierarchy tree according to an embodiment.
Figure 15:
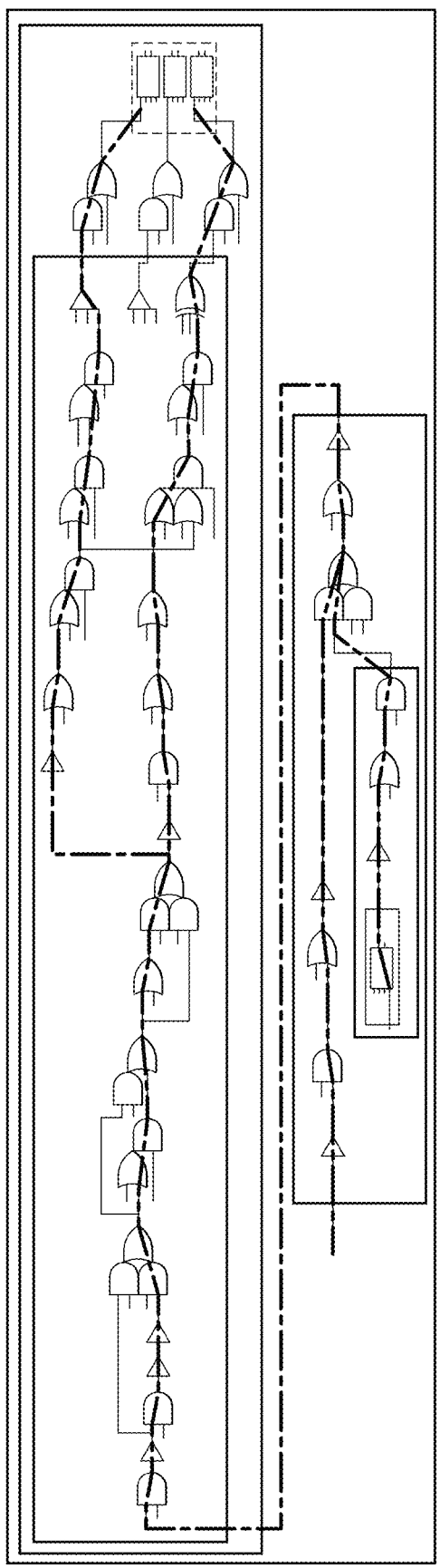
FIG. 15 illustrates schematic of critical timing paths through a bottleneck cell according to an embodiment.

The system performs logical hierarchy-based reporting of timing metrics (WNS, TNS, NVP, Logical Level violations, Bottleneck cells, net length, path length, and zero wire load violating nets) based upon analysis of implementation quality timing. FIG. 12 illustrates propagation of the WNS, TNS and NVP metrics numbers up the logic hierarchy tree.

Using the logical hierarchical an RTL Engineer can now easily pinpoint which modules are having an impact on ability for their design to close timing. This is possible for all the metrics computed by the system. Once a problematic module or possibly a number of modules, are identified, the system allows the user to drill down further using the interface, such as by selecting the actual timing paths (and the cells/nets of paths) that are contributing to the timing issues in that module. Finally, a user can find out where the cells are instantiated from within their RTL.

Efficient Representation Technique

The system processes hierarchical designs and links them either with design netlist or netlist representation for the sub-blocks.

Figure 19:
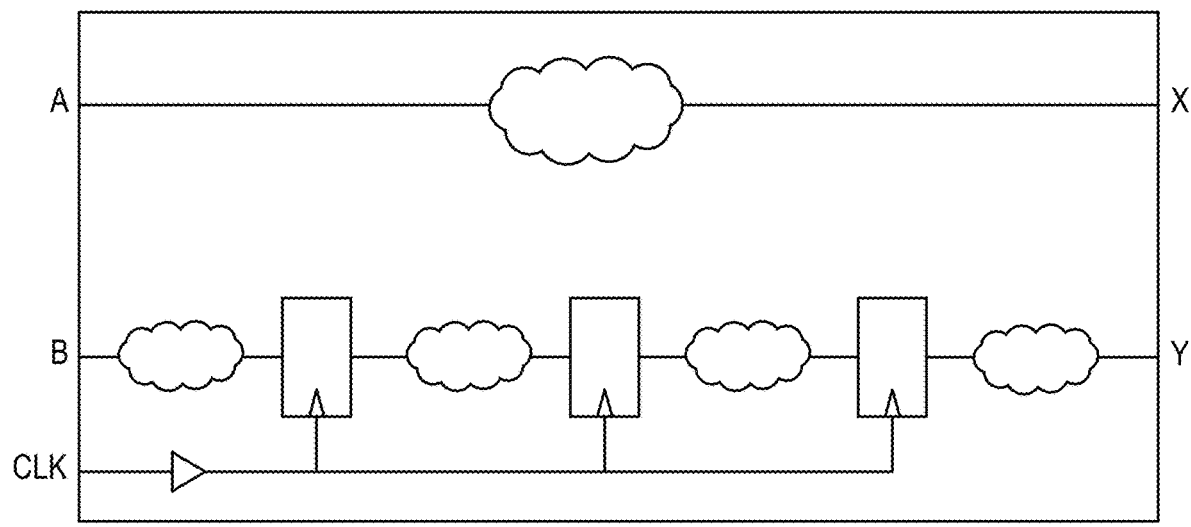
FIG. 19 illustrates a design netlist according to an embodiment.

FIG. 19 shows an example of a full netlist of circuit design. The netlist shown in FIG. 19 has following properties. (1) It contains various types of timing paths (port-to-port, port-to-register, register-to-register, register-to-port). (2) The netlist includes all details and paths needed to debug/analyze the timing/congestion/power. (3) It incurs higher flow runtime and memory for large designs.

Figure 20:
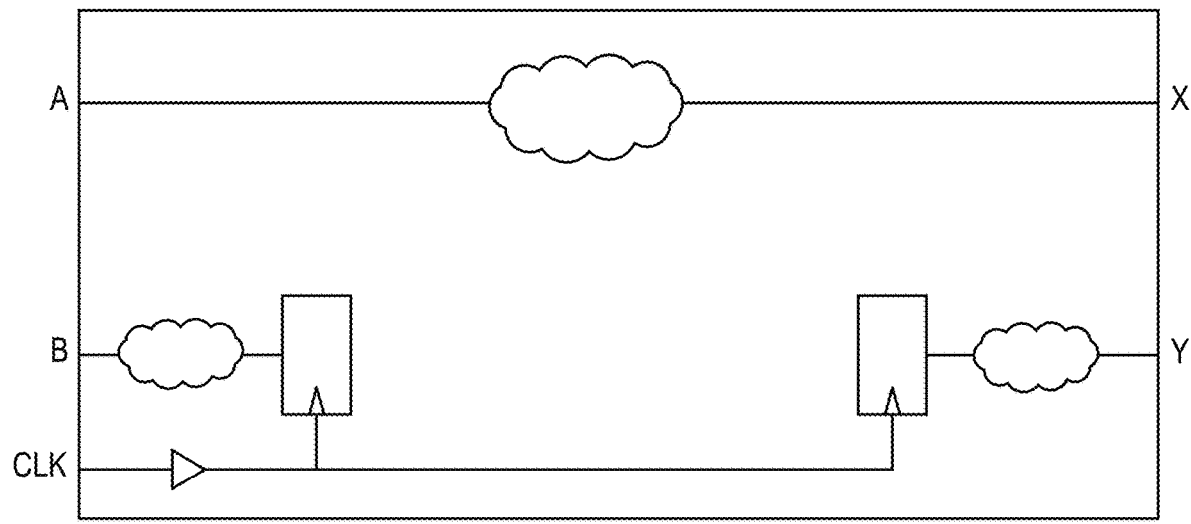
FIG. 20 illustrates the representation technique according to an embodiment.
Figure 21:
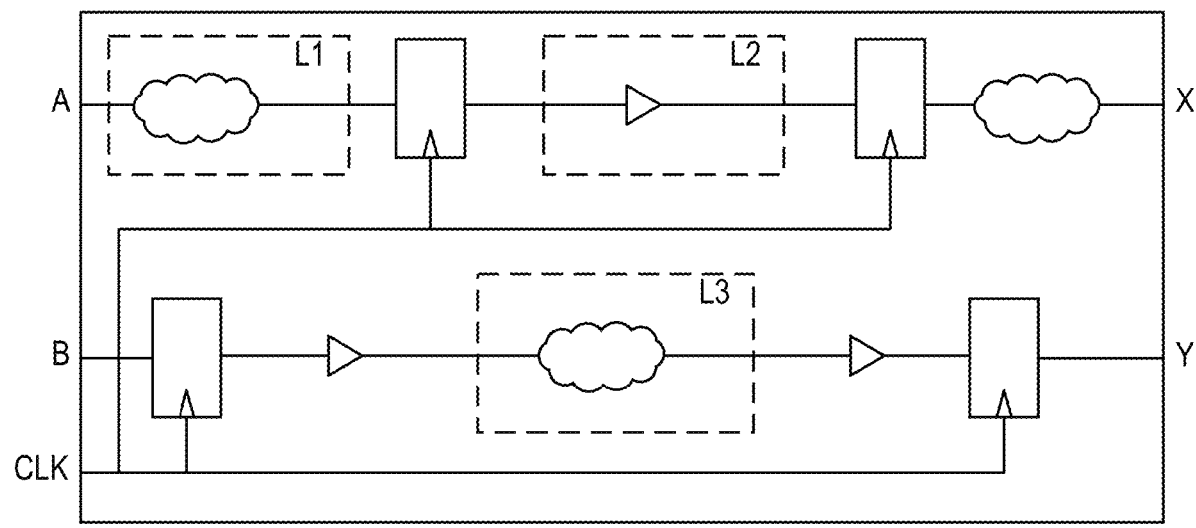
FIG. 21 illustrates full design netlist according to an embodiment.

The system transforms the full netlist shown in FIG. 19 to exclude certain details to generate an efficient netlist. FIG. 20 illustrates a circuit design generated by the system that does not include all the details of the full netlist of the circuit design. The system only retains non-critical interface paths and excludes register-to-register non-critical interface paths. The system may retain only interface timing paths are available to debug/analyze the timing/congestion/power. The netlist shown in FIG. 20 has following properties. (1) It contains only the critical interface timing paths. (2) Register-to-register and non-critical interface paths are not retained. (3) The netlist incurs smaller execution runtime and memory as compared to a full design netlist.

Figure 22:
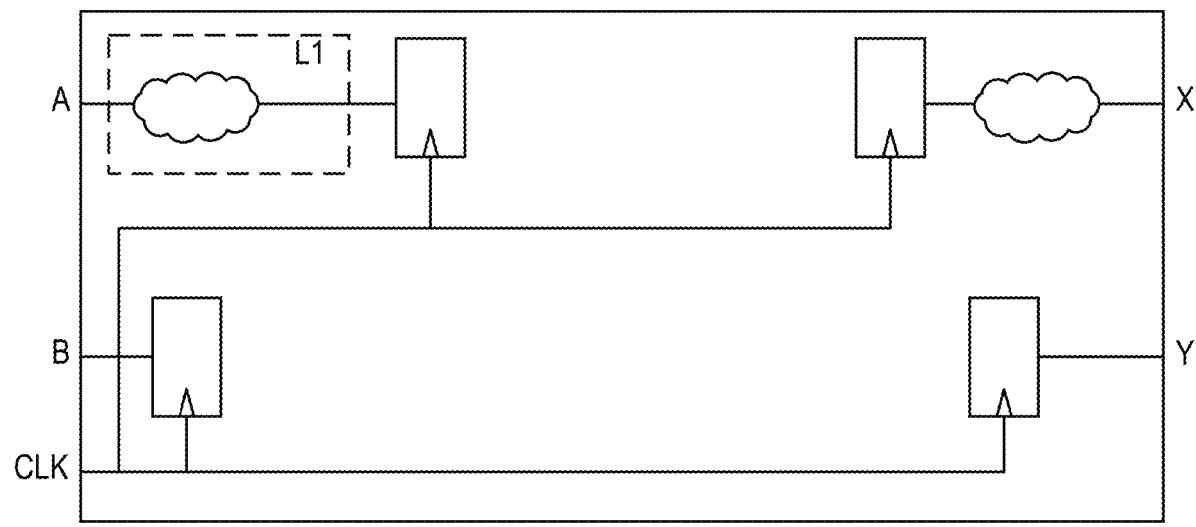
FIG. 22 illustrates a representation technique according to an embodiment.

A set of timing/congestion/power metrics data is computed on a design which has been synthesized and is placed and globally routed. For analyzing the metric data of a sub-system or System On Chip (SOC) design, the system has to load the entire design into memory. Design integrators typically want to look at such data for the entire sub-system or SOC by loading it into memory. This can be memory intensive. FIG. 22 shows a circuit representation with full netlist that is modified by the system to eliminate interface timing paths that are not critical to obtain netlist of FIG. 22. Using the representation which contains only the critical interface timing paths (FIG. 22) in the hierarchical flow, the system allows analysis of the timing/congestion/power only along the interface timing paths.

Figure 23:
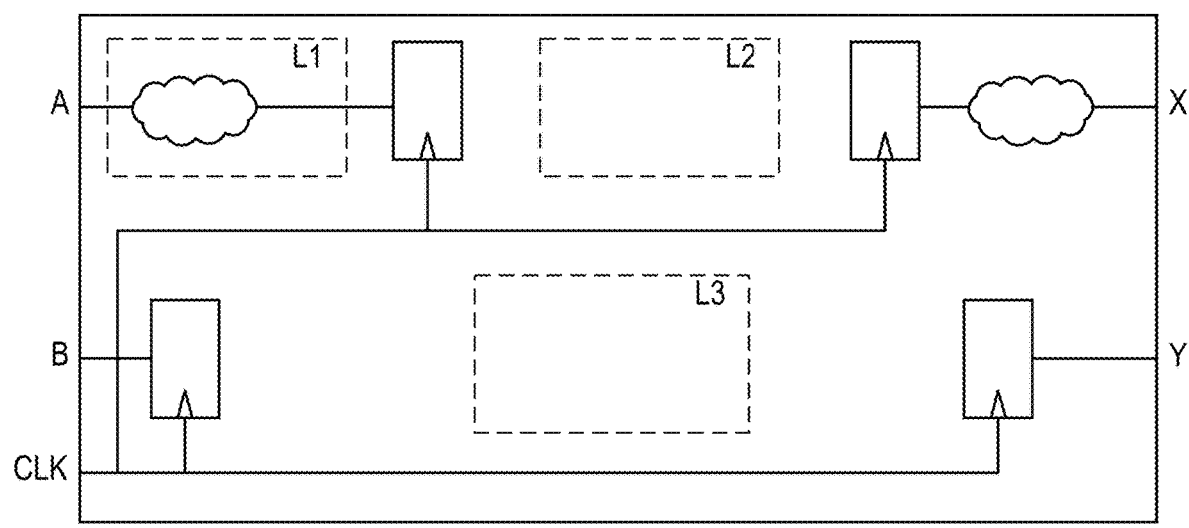
FIG. 23 illustrates an enhanced representation technique according to an embodiment.

In order to keep the representation light-weight and use them in the hierarchical flow to visualize and analyze the timing/congestion/power metrics for the entire block netlist, all logical hierarchies of the core netlist (only empty logical hierarchies L2, L3 and not the logic within, as shown in FIG. 23) are retained by the system in addition to the interface netlist (logical hierarchy L1 in FIG. 22) and have various metric data stored on them (derived from full netlist inside each logic hierarchy). Accordingly, the system stores sub-blocks within a circuit block to maintain the hierarchical structure of the circuit design but excludes details of circuit components that are not needed to determine the hierarchical structure.

This enhanced representation technique used by the system allows the representation of timing/congestion/power metrics of not just the interface logic but the entire design while still maintaining the netlist compression benefit of a simplified representation.

The timing/congestion/power metrics persistent data present on the logical hierarchies of the design is copied to the simplified netlist representation (metrics data represented as yellow stars on logical hierarchies L1, L2 and L3 in FIG. 23). This metrics data can be queried on the logical hierarchies inside the simplified representation.

Figure 24:
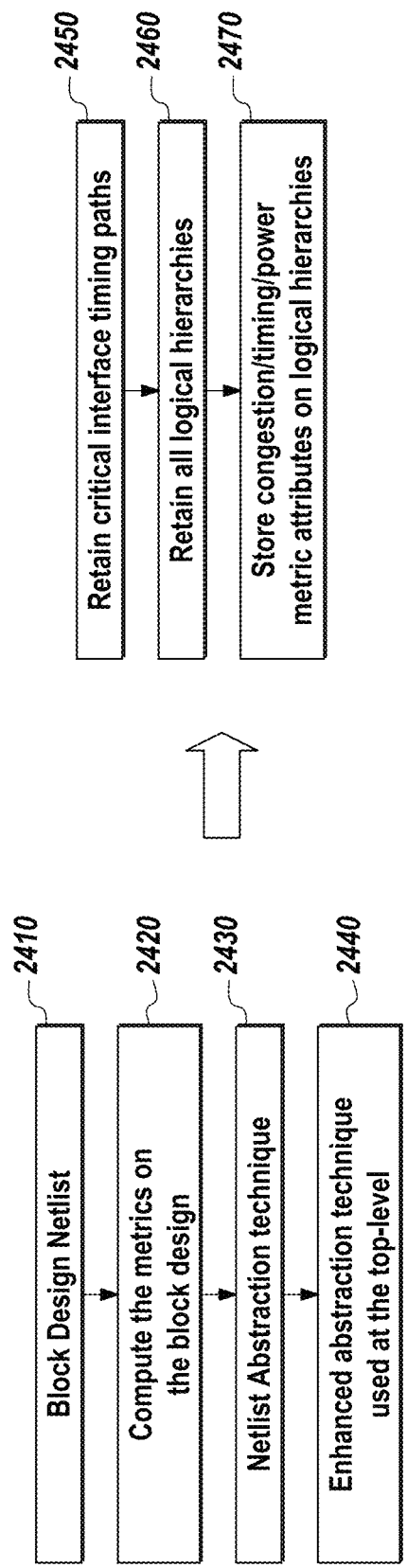
FIG. 24 illustrates a flow diagram illustrating the process of generating an efficient representation, according to an embodiment according to an embodiment.

FIG. 24 illustrates a flow diagram illustrating the process of generating an efficient representation, according to an embodiment according to an embodiment. The system receives 2410 the block level circuit design including netlists. The system computes 2420 the metrics on the block design. The system generates 2430 the netlist representation by performing the steps including: retaining 2450 critical interface timing paths, retaining 2460 logical hierarchies, and storing 2470 congestion/timing/power metric attributes along the logical hierarchy. The system determines 2440 the enhances representation of the logical hierarchy of the circuit design.

Embodiments provide runtime/capacity improvements compared to conventional techniques by using a minimal netlist representation. Embodiments allow a user to analyse/debug timing, power and congestion issues throughout the entire hierarchy of a design, even though a minimal netlist representation is used.

Figure 25:
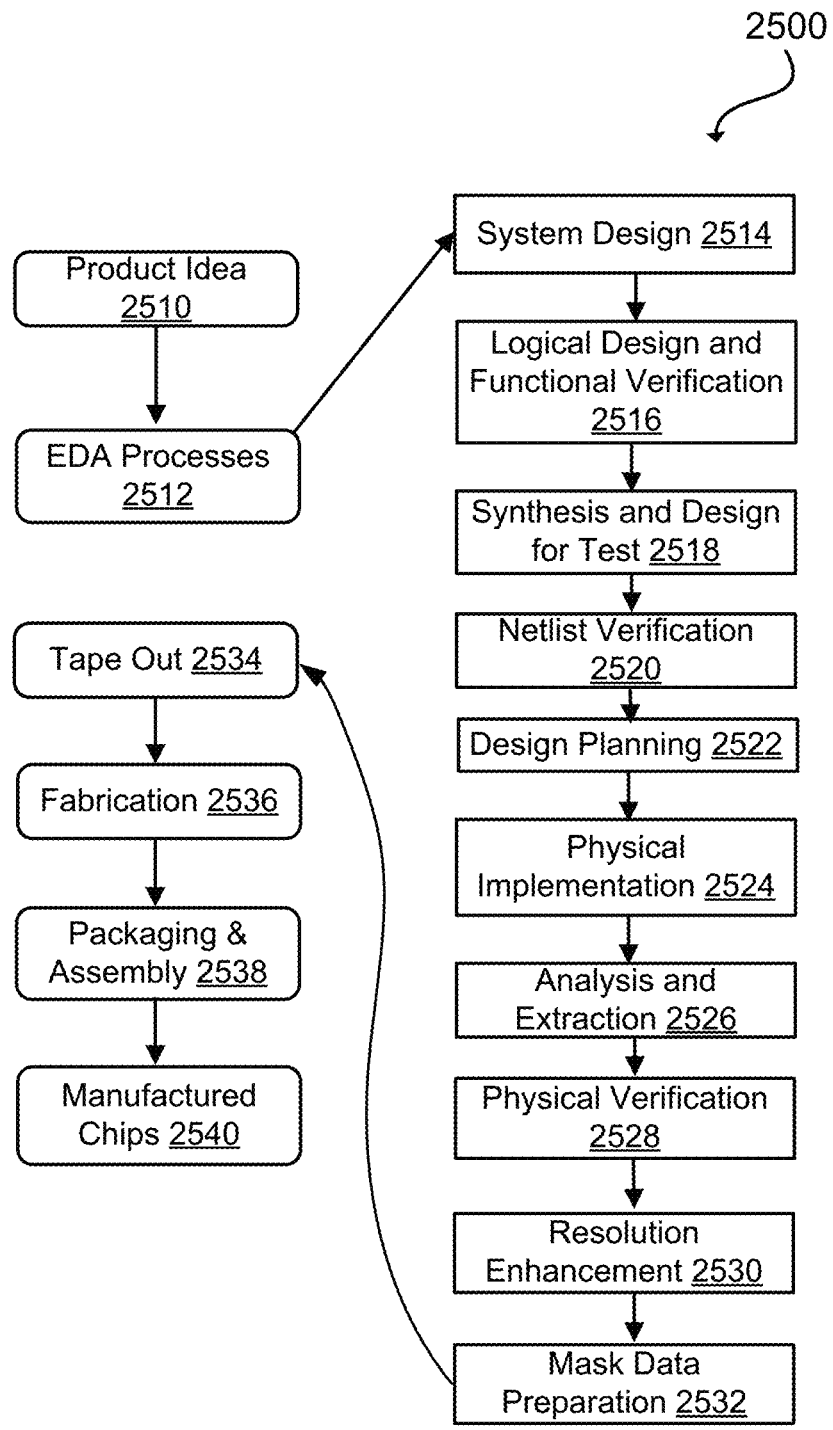
FIG. 25 depicts a flowchart of various processes used during the design and manufacture of an integrated circuit in accordance with some embodiments of the present disclosure.

FIG. 25 illustrates an example set of processes 2500 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 2510 with information supplied by a designer, information which is transformed to create an article of manufacture that uses a set of EDA processes 2512. When the design is finalized, the design is taped-out 2534, which is when artwork (e.g., geometric patterns) for the integrated circuit is sent to a fabrication facility to manufacture the mask set, which is then used to manufacture the integrated circuit. After tape-out, a semiconductor die is fabricated 2536 and packaging and assembly processes 2538 are performed to produce the finished integrated circuit 2540.

Specifications for a circuit or electronic structure may range from low-level transistor material layouts to high-level description languages. A high-level of representation may be used to design circuits and systems, using a hardware description language ('HDL') such as VHDL, Verilog, System Verilog, SystemC, MyHDL or Open Vera. The HDL description can be transformed to a logic-level register transfer level ('RTL') description, a gate-level description, a layout-level description, or a mask-level description. Each lower representation level that is a more concrete description adds more useful detail into the design description, for example, more details for the modules that include the description. The lower levels of representation that are more concrete descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding tools of that layer (e.g., a formal verification tool). A design process may use a sequence depicted in FIG. 25. The processes described by be enabled by EDA products (or tools).

During system design 2514, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 2516, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 2518, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 2520, the netlist is checked for compliance with timing constraints and for correspondence with the HDL code. During design planning 2522, an overall floor plan for the integrated circuit is constructed and analyzed for timing and top- level routing.

During layout or physical implementation 2524, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 2526, the circuit function is verified at the layout level, which permits refinement of the layout design. During physical verification 2528, the layout design is checked to ensure that manufacturing constraints are correct, such as DRC constraints, electrical constraints, lithographic constraints, and that circuitry function matches the HDL design specification. During resolution enhancement 2530, the geometry of the layout is transformed to improve how the circuit design is manufactured.

During tape-out, data is created to be used (after lithographic enhancements are applied if appropriate) for production of lithography masks. During mask data preparation 2532, the 'tape-out' data is used to produce lithography masks that are used to produce finished integrated circuits.

A storage subsystem of a computer system may be used to store the programs and data structures that are used by some or all of the EDA products described herein, and products used for development of cells for the library and for physical and logical design that use the library.

Figure 26:
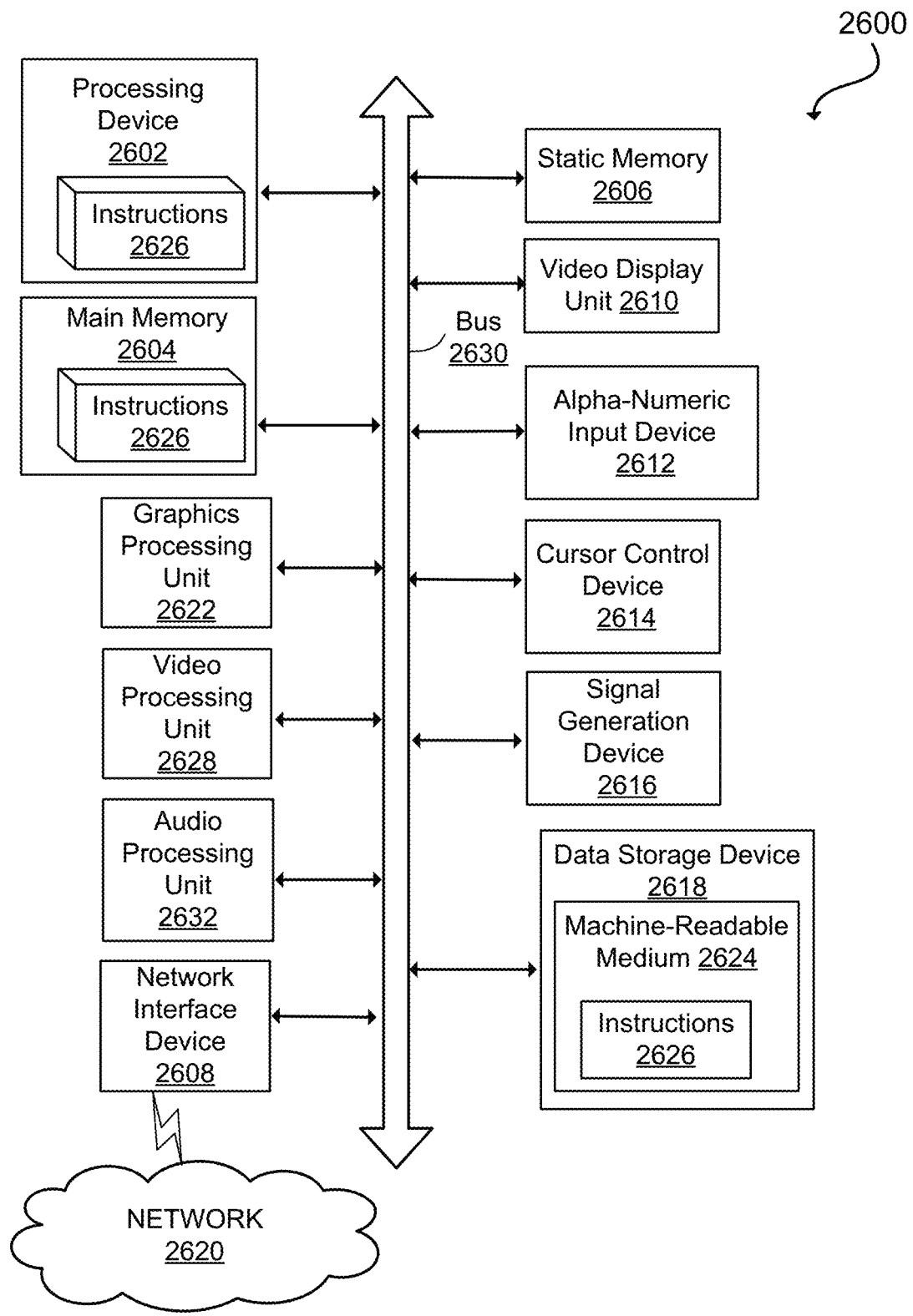
FIG. 26 depicts a diagram of an example computer system in which embodiments of the present disclosure may operate.

FIG. 26 illustrates an example machine of a computer system 2600 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client- server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 2600 includes a processing device 2602, a main memory 2604 (e.g., read-only memory (ROM), flash memory, dynamic random access memory (DRAM) such as synchronous DRAM (SDRAM), a static memory 2606 (e.g., flash memory, static random access memory (SRAM), etc.), and a data storage device 2618, which communicate with each other via a bus 2630.

Processing device 2602 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 2602 may also be one or more special-purpose processing devices such as an application specific integrated circuit (ASIC), a field programmable gate array (FPGA), a digital signal processor (DSP), network processor, or the like. The processing device 2602 may be configured to execute instructions 2626 for performing the operations and steps described herein.

The computer system 2600 may further include a network interface device 2608 to communicate over the network 2620. The computer system 2600 also may include a video display unit 2610 (e.g., a liquid crystal display (LCD) or a cathode ray tube (CRT)), an alphanumeric input device 2612 (e.g., a keyboard), a cursor control device 2614 (e.g., a mouse), a graphics processing unit 2622, a signal generation device 2616 (e.g., a speaker), graphics processing unit 2622, video processing unit 2628, and audio processing unit 2632.

The data storage device 2618 may include a machine-readable storage medium 2624 (also known as a non-transitory computer-readable medium) on which is stored one or more sets of instructions 2626 or software embodying any one or more of the methodologies or functions described herein. The instructions 2626 may also reside, completely or at least partially, within the main memory 2604 and/or within the processing device 2602 during execution thereof by the computer system 2600, the main memory 2604 and the processing device 2602 also constituting machine-readable storage media.

In some implementations, the instructions 2626 include instructions to implement functionality corresponding to the present disclosure. While the machine-readable storage medium 2624 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 2602 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A computer-implemented method for determining physical design information along a logic hierarchy of a circuit design, the method comprising:
   accessing a physical design metric associated with different parts of a physical design of a circuit;
   accessing a logic design of the circuit comprising a hierarchy of logic blocks;
   determining, by a processor, the physical design metric associated with one or more logic blocks of the hierarchy of the logic design based on a relation between the physical design and the logic design, the determining comprising, propagating aggregate data up the hierarchy by aggregating metrics at circuit blocks at physical design level to obtain aggregate metrics for higher level circuit blocks corresponding to the one or more logic blocks of the hierarchy of the logic design;
   configuring a user interface to display the hierarchy of the logic design of the circuit along with the physical design metric associated with the one or more logic blocks of the hierarchy; and
   sending the configured user interface for display.

2. The computer-implemented method of claim 1, wherein the physical design metric indicates a degree of congestion in various portions of the circuit.

3. The computer-implemented method of claim 1, wherein the physical design metric aggregates timing data for nets associated with a logic block of the hierarchy of logic blocks.

4. The computer-implemented method of claim 1, wherein the physical design metric represents one of: a logic level violation, a bottleneck cell count, a path length violation, or a net length violation.

5. The computer-implemented method of claim 1, wherein the physical design metric represents timing data associated with various cells, nets and pins of the circuit.

6. The computer-implemented method of claim 1, wherein the logic design of the circuit is represented using an enhanced block representation that includes one or more sub-blocks of the circuit within a block to represent the hierarchy of the circuit but excludes circuit components within a sub-block.

7. The computer-implemented method of claim 6, wherein the enhanced block representation retains an interface netlist for a sub-block.

8. A non-transitory computer readable medium comprising stored instructions, which when executed by a computer processor, cause the computer processor to:
   access a physical design metric associated with different parts of a physical design of a circuit;
   access a logic design of the circuit comprising a hierarchy of logic blocks;
   determine the physical design metric associated with one or more logic blocks of the hierarchy of the logic design based on a relation between the physical design and the logic design, the determining comprising, propagating aggregate data up the hierarchy by aggregating metrics at circuit blocks at physical design level to obtain aggregate metrics for higher level circuit blocks corresponding to the one or more logic blocks of the hierarchy of the logic design; configure a user interface to display the hierarchy of the logic design of the circuit along with the physical design metric associated with the one or more logic blocks of the hierarchy; and
   send the configured user interface for display.

9. The non-transitory computer readable medium of claim 8, wherein the physical design metric indicates a degree of congestion in various portions of the circuit.

10. The non-transitory computer readable medium of claim 8, wherein the physical design metric aggregates timing data for nets associated with a logic block of the hierarchy of logic blocks.

11. The non-transitory computer readable medium of claim 8, wherein the physical design metric represents one of: a logic level violation, a bottleneck cell count, a path length violation, or a net length violation.

12. The non-transitory computer readable medium of claim 8, wherein the physical design metric represents timing data is associated with various cells, nets and pins of the circuit.

13. The non-transitory computer readable medium of claim 8, wherein the logic design of the circuit is represented using an enhanced block representation that includes one or more sub-blocks of the circuit within a block to represent the hierarchy of the circuit but excludes circuit components within a sub-block.

14. The non-transitory computer readable medium of claim 13, wherein the enhanced block representation retains an interface netlist for a sub-block.

15. A computer-implemented system comprising:
a memory storing instructions; and
a processor, coupled with the memory and to execute the instructions, the instructions when executed cause the processor to:
access a physical design metric associated with different parts of a physical design of a circuit;
access a logic design of the circuit comprising a hierarchy of logic blocks;
determine the physical design metric associated with one or more logic blocks of the hierarchy of the logic design based on a relation between the physical design and the logic design, the determining comprising, propagating aggregate data up the hierarchy by aggregating metrics at circuit blocks at physical design level to obtain aggregate metrics for higher level circuit blocks corresponding to the one or more logic blocks of the hierarchy of the logic design;
configure a user interface to display the hierarchy of the logic design of the circuit along with the physical design metric associated with the one or more logic blocks of the hierarchy; and
send the configured user interface for display.

16. The computer-implemented system of claim 15, wherein the physical design metric indicates a degree of congestion in various portions of the circuit.

17. The computer-implemented system of claim 15, wherein the physical design metric aggregates timing data for nets associated with a logic block of the hierarchy of logic blocks.

18. The computer-implemented system of claim 15, wherein the physical design metric represents one of: a logic level violation, a bottleneck cell count, a path length violation, or a net length violation.

19. The computer-implemented system of claim 15, wherein the physical design metric represents timing data is associated with various cells, nets and pins of the circuit.

20. The computer-implemented system of claim 15, wherein the logic design of the circuit is represented using an enhanced block representation that includes one or more sub-blocks of the circuit within a block to represent the hierarchy of the circuit but excludes circuit components within a sub-block.

\* \* \* \* \*